(12) United States Patent
Tsunekawa

(10) Patent No.: US 11,269,565 B2
(45) Date of Patent: Mar. 8, 2022

(54) IMAGE FORMING APPARATUS THAT EDITS PAGE DESCRIPTION LANGUAGE BASED ON A DELETE INSTRUCTION, AND A RELATED CONTROL METHOD AND STORAGE MEDIUM

(71) Applicant: CANON KABUSHIKI KAISHA, Tokyo (JP)

(72) Inventor: Kiyohiro Tsunekawa, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/051,832

(22) Filed: Aug. 1, 2018

(65) Prior Publication Data

US 2019/0034133 A1    Jan. 31, 2019

Related U.S. Application Data

(63) Continuation of application No. 15/219,669, filed on Jul. 26, 2016, now Pat. No. 10,048,903.

(30) Foreign Application Priority Data

Aug. 5, 2015    (JP) ................................ 2015-155393

(51) Int. Cl.
  *G06K 15/00*    (2006.01)
  *G06F 3/12*    (2006.01)
  *H04N 1/00*    (2006.01)

(52) U.S. Cl.
  CPC .......... *G06F 3/1208* (2013.01); *G06F 3/1244* (2013.01); *G06F 3/1285* (2013.01); *H04N 1/00307* (2013.01); *H04N 2201/0094* (2013.01)

(58) Field of Classification Search
  CPC .... G06F 3/1208; G06F 3/1244; G06F 3/1285; H04N 1/00307; H04N 2201/0094
  See application file for complete search history.

(56) References Cited

U.S. PATENT DOCUMENTS

| 6,583,890 B1 | 6/2003 | Mastie et al. |
| 7,505,156 B2 | 3/2009 | Tsunekawa |

(Continued)

FOREIGN PATENT DOCUMENTS

| JP | 2006-123319 A | 5/2006 |
| JP | 2006-180044 A | 7/2006 |

(Continued)

OTHER PUBLICATIONS

Office Action dated Apr. 24, 2019, issued in Japanese Patent Application No. 2015-155393.

*Primary Examiner* — Huo Long Chen
(74) *Attorney, Agent, or Firm* — Venable LLP

(57) ABSTRACT

A printing apparatus includes a printer that prints an image on a sheet, an operation panel that receives an operation from a user, a storage device that stores page description language (PDL) data including PDL commands of a plurality of pages received from an external apparatus, and at least one processor. The at least one processor executes a set of instructions to receive a delete instruction for deleting at least one page of the PDL data stored in the storage device, via the operation panel, to edit the PDL data based on the delete instruction, to generate image data of a page other than the at least one page to be deleted in accordance with the delete instruction, based on the edited PDL data, and to cause the printer to execute printing based on the generated image data.

18 Claims, 17 Drawing Sheets

(56) References Cited

U.S. PATENT DOCUMENTS

| | | | |
|---|---|---|---|
| 8,422,046 B2 | 4/2013 | Tsunekawa | |
| 8,656,278 B2 | 2/2014 | Kuranoshita | |
| 8,867,075 B2 | 10/2014 | Fujita | |
| 8,913,278 B2 | 12/2014 | Tsunekawa | |
| 8,941,879 B2 | 1/2015 | Takahashi | |
| 9,910,629 B2 | 3/2018 | Tsunekawa | |
| 2003/0002063 A1* | 1/2003 | Oomura | G06F 40/109 358/1.11 |
| 2004/0105123 A1 | 6/2004 | Fritz et al. | |
| 2005/0024682 A1* | 2/2005 | Hull | G06F 16/4393 358/1.18 |
| 2005/0174587 A1 | 8/2005 | Hara | |
| 2008/0259392 A1* | 10/2008 | Tokumoto | G06F 3/1213 358/1.15 |
| 2009/0300479 A1 | 12/2009 | Kuranoshita | |
| 2009/0316171 A1* | 12/2009 | Kurihara | H04N 1/00204 358/1.9 |
| 2010/0231937 A1 | 9/2010 | Tsunekawa | |
| 2011/0043859 A1* | 2/2011 | Matsui | G06K 15/1822 358/1.16 |
| 2012/0293832 A1 | 11/2012 | Fujita | |
| 2013/0169981 A1 | 7/2013 | Takahashi | |
| 2013/0201521 A1* | 8/2013 | Tsunekawa | H04N 1/00442 358/1.15 |
| 2013/0246915 A1* | 9/2013 | Ishibashi | G06F 3/1256 715/274 |
| 2014/0078539 A1 | 3/2014 | Kakitsuba | |
| 2014/0240741 A1* | 8/2014 | Ogawa | G06F 3/1264 358/1.13 |
| 2015/0160901 A1* | 6/2015 | Hashimoto | G06F 3/1241 358/1.15 |
| 2015/0193430 A1 | 7/2015 | Yoshizaki et al. | |
| 2016/0028920 A1* | 1/2016 | Hashimoto | H04N 1/00811 358/534 |
| 2016/0086062 A1* | 3/2016 | Torii | G06K 15/408 358/1.13 |

FOREIGN PATENT DOCUMENTS

| | | |
|---|---|---|
| JP | 2007-025969 A | 2/2007 |
| JP | 2009-288884 A | 12/2009 |
| JP | 2011-159219 A | 8/2011 |
| JP | 2012-240344 A | 12/2012 |
| JP | 2013-134739 A | 7/2013 |
| JP | 2013-140436 A | 7/2013 |
| JP | 2013-162422 A | 8/2013 |
| JP | 2014-092928 A | 5/2014 |

* cited by examiner

FIG. 5

501:
```
<ESC>%-12345X
@PJL JOB[lf]
@PJL SET JOBATTR="Owner=A111"[lf]
@PJL ENTER LANGUAGE=PDL1[lf]
```
···PDL JOB TERMINATE(Universal Exit Language)
···PJL JOB START
···JOB OWNER NAME (USER IDENTIFIER)
···PDL LANGUAGE DESIGNATION 502:
```
BeginJob[RESOLUTION]
BeginPage[SHEET SIZE][SHEET TYPE]
SetColorMode[COLOR MODE]
(RENDERING COMMAND (TEXT/IMAGE/GRAPHIC))
EndPage
EndJob
```
<PDL COMMAND>

503:
```
<ESC>%-12345X
@PJL EOJ[lf]
```
···PDL JOB TERMINATE(Universal Exit Language)
···PJL JOB TERMINATE

FIG. 8A

| BYTE EXPRESSION | PARAMETER EXAMPLE | MEANING | ESSENTIAL/ OPTIONAL | SIZE | INITIAL VALUE |
|---|---|---|---|---|---|
| <0x02> | - | Begin Page | - | - | - |
| <0xe7> | (4700)(6700) | IMAGE AREA SIZE | ESSENTIAL | 1 | - |
| <0xd1> | (0x00) | IMAGE DIRECTION (0=0°) | ESSENTIAL | MAXIMUM 4 | - |
| <0xd2> | (0x00) | ORIENTATION (VERTICALLY LONG) | OPTIONAL | 1 | 0 (VERTICALLY LONG) |
| <0xd3> | (0x78)(0x78) | ORIGIN POINT | OPTIONAL | MAXIMUM 4 | (0,0) |
| <0xd4> | (0x01) | COLOR MODE (1=CL) | OPTIONAL | 1 | 0(BW) |

FIG. 8B

| | | | |
|---|---|---|---|
| 809 | <0x02> | NONE | Begin Page |
| 810 | <0xe7> | (4700)(6700) | IMAGE REGION SIZE (A4) |
| | <0xd1> | (0x00) | IMAGE DIRECTION (0=0°) |
| | <0xd2> | (0x00) | ORIENTATION (VERTICALLY LONG) |
| 811 | <0x02> | NONE | Begin Page |
| 812 | <0xe7> | (6700)(9400) | IMAGE REGION SIZE (A3) |
| | <0xd1> | (0x01) | IMAGE DIRECTION (0=90°) |
| | <0xd2> | (0x01) | ORIENTATION (HORIZONTALLY LONG) |
| | <0xd3> | (0x78)(0x78) | ORIGIN POINT |
| | <0xd4> | (0x01) | COLOR MODE (1=CL) |

FIG. 8C

| | | | |
|---|---|---|---|
| 813 | <0x02> | NONE | Begin Page |
| 814 | <0xe7> | (4700)(6700) | IMAGE REGION SIZE (A4) |
| | <0xd1> | (0x00) | IMAGE DIRECTION (0=0°) |
| | <0xd2> | (0x00) | ORIENTATION (VERTICALLY LONG) |
| 815 | <0xd3> | (0x0000)(0x0000) | ORIGIN POINT (INITIAL VALUE) |
| | <0xd4> | (0x00) | COLOR MODE (0:INITIAL VALUE) |

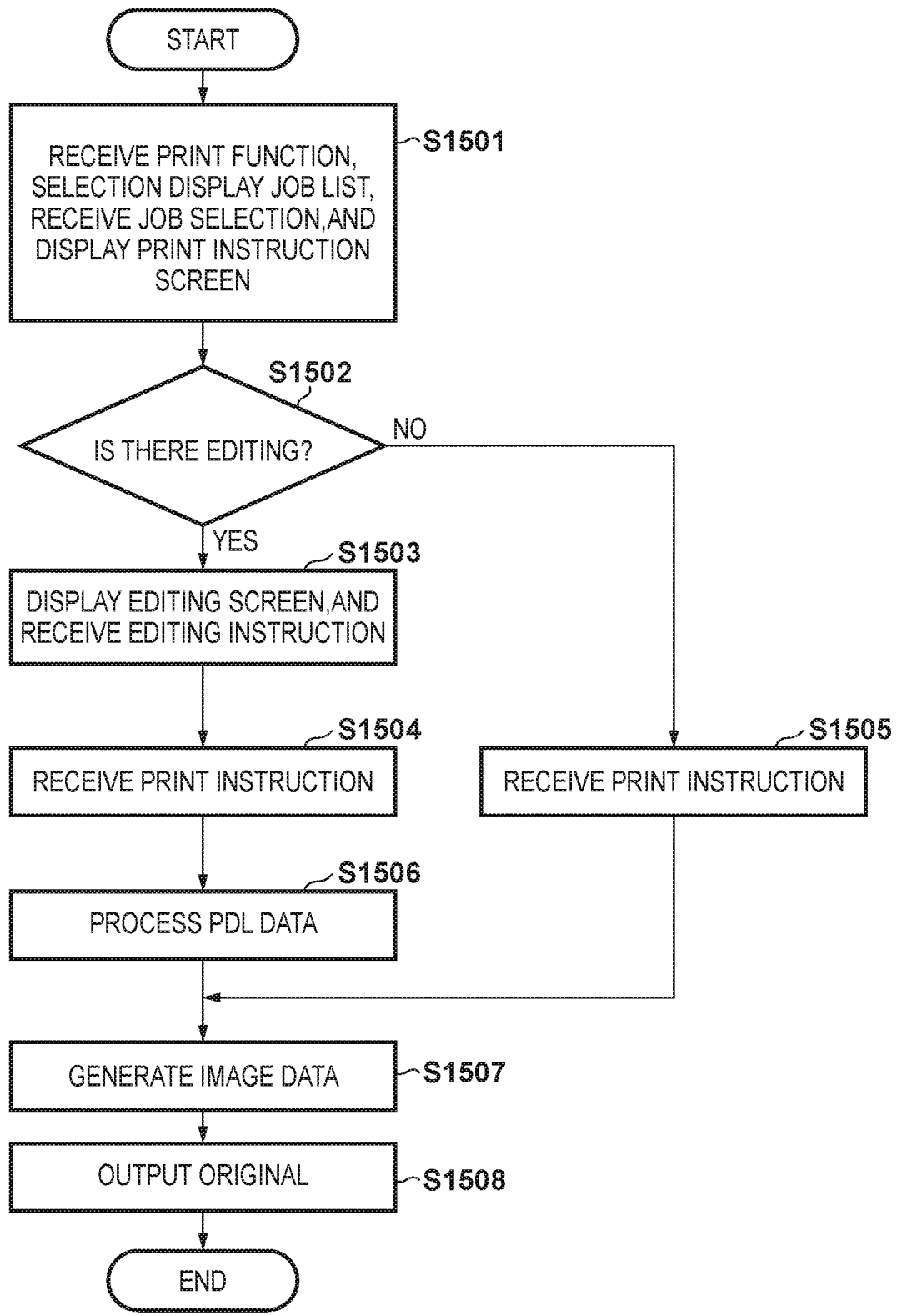

IMAGE FORMING APPARATUS THAT EDITS PAGE DESCRIPTION LANGUAGE BASED ON A DELETE INSTRUCTION, AND A RELATED CONTROL METHOD AND STORAGE MEDIUM

This application is a continuation application of U.S. patent application Ser. No. 15/219,669, filed Jul. 26, 2016, which claims the benefit of Japanese Patent Application No. 2015-155393 filed on Aug. 5, 2015, which are hereby incorporated by reference herein in their entirety.

BACKGROUND OF THE INVENTION

Field of the Invention

The present invention relates to an image forming apparatus, a method of controlling the same, and a storage medium.

Description of the Related Art

Conventionally, image processing apparatuses, such as printers and multifunction peripherals (MFPs), are known as apparatuses that form images on sheets (printing material). Recently, printers that operate in a so-called waiting print method that, rather than immediately printing print data inputted from a PC (personal computer) or the like, start printing in accordance with an instruction of a user who directly operates the printer, have been more widespread.

In this waiting print method, there are cases in which print content is changed by a user immediately prior to the printing being performed. For example, a function by which it is possible to delete a particular page of a document that is stored on an image processing apparatus that is designated by a user, and the like, have emerged.

Meanwhile, it is known that it is possible to register to a memory or a storage in an image processing apparatus, in advance, a page description language (PDL) resource (also referred to as a resource), such as a tile pattern or font data, that is referenced at a time of PDL rendering processing as a PDL language specification. As such resources, groups of PDL commands (also referred to as commands) of a plurality of types are registered and managed by an ID (identification), or the like, in advance, and there are PDLs that can handle image profile data, overlays, macro control commands, or the like, used by executing a command group based on the ID.

In a typical PDL language specification, after an instruction to register a resource, as described above, is performed, it is possible to reference the resource from a plurality of different pages, and, in such a case, it is referred to as "resource inheritance level is job", from the resource inheritance being inherited within the print job. Meanwhile, in a case in which a resource is valid only in a page for which the registration instruction is performed, and there is no inheritance between pages, it is referred to as "resource inheritance level is page". A technique related to a method for managing resources that are inherited across a plurality of pages in this way is recited in, for example, Japanese Patent Laid-Open No. 2011-159219, and a method for deleting, from a memory, resources that are unnecessary after rendering processing is proposed thereby.

A preview function for displaying, on an operation screen, thumbnail images in units of pages in relation to a job for printing a saved PDL in such an authenticated print job, and a function for deleting a particular page prior to printing based on an instruction of a user that references a preview result are desirable. Note that, in processing for printing PDL data, unlike a copy or a facsimile, it is necessary to generate image data of a page by interpreting commands described in PDL, and, therefore, the processing speed depends on the complexity of the PDL. Accordingly, it is desirable to delete unnecessary pages in advance.

In the case in which the language specification of the PDL is "resource inheritance level is job", however, there is a problem in that the processing load for deleting a particular page is large. This is because referents of a resource of a page that is a deletion target are checked, and as long as it is not confirmed that the resource is not referenced in another page, the resource of the deletion target page cannot be deleted.

SUMMARY OF THE INVENTION

The present invention enables realization of a technique for efficiently deleting a particular page included in a job described by PDL data even in a case in which a PDL data resource inheritance level spans pages.

One aspect of the present invention provides an image forming apparatus comprising an image forming unit configured to form an image on a sheet, a reception unit configured to receive a print command from an operation user, and a control unit that has at least one memory storing a program and at least one processor executing the program, wherein the control unit is configured to obtain a PDL data including information of a plurality of pages, to edit the obtained PDL data in accordance with the reception unit receiving the print command of a first part of pages that excludes a second part of pages among the plurality pages, to generate image data of the first part of pages based on the edited PDL data, and to cause the image forming unit to form the image based on the generated image data.

Another aspect of the present invention provides a method of controlling an image forming system comprising an image forming unit configured to form an image on a sheet, and a reception unit configured to receive a print command from an operation user, the method comprising obtaining a PDL data including information of a plurality of pages, editing the obtained PDL data in accordance with the reception unit receiving the print command of a first part of pages that excludes a second part of pages among the plurality pages, generating image data of the first part of pages based on the edited PDL data, and causing the image forming unit to form the image based on the generated image data.

Still another aspect of the present invention provides a non-transitory computer-readable storage medium storing a computer program for causing a computer to execute a control method of controlling an image forming system comprising an image forming unit configured to form an image on a sheet, and a reception unit configured to receive a print command from an operation user, the method comprising obtaining a PDL data including information of a plurality of pages, editing the obtained PDL data in accordance with the reception unit receiving the print command of a first part of pages that excludes a second part of pages among the plurality pages, generating image data of the first part of pages based on the edited PDL data, and causing the image forming unit to form the image based on the generated image data.

Further features of the present invention will become apparent from the following description of exemplary embodiments, with reference to the attached drawings.

BRIEF DESCRIPTION OF THE DRAWINGS

FIG. 5 is a view for illustrating a data configuration of a print job in the first embodiment.

FIG. 8A illustrates a configuration of a page start command in a second embodiment.

FIG. 8B illustrates a configuration of PDL data. FIG. 8C illustrates a page start command configuration following editing.

FIG. 15 is a view for illustrating a flowchart of processing for printing.

DESCRIPTION OF THE EMBODIMENTS

Embodiments of the present invention will now be described in detail with reference to the drawings. It should be noted that the relative arrangement of the components, the numerical expressions, and the numerical values set forth in these embodiments do not limit the scope of the present invention unless it is specifically stated otherwise.

First Embodiment

Figure 1:
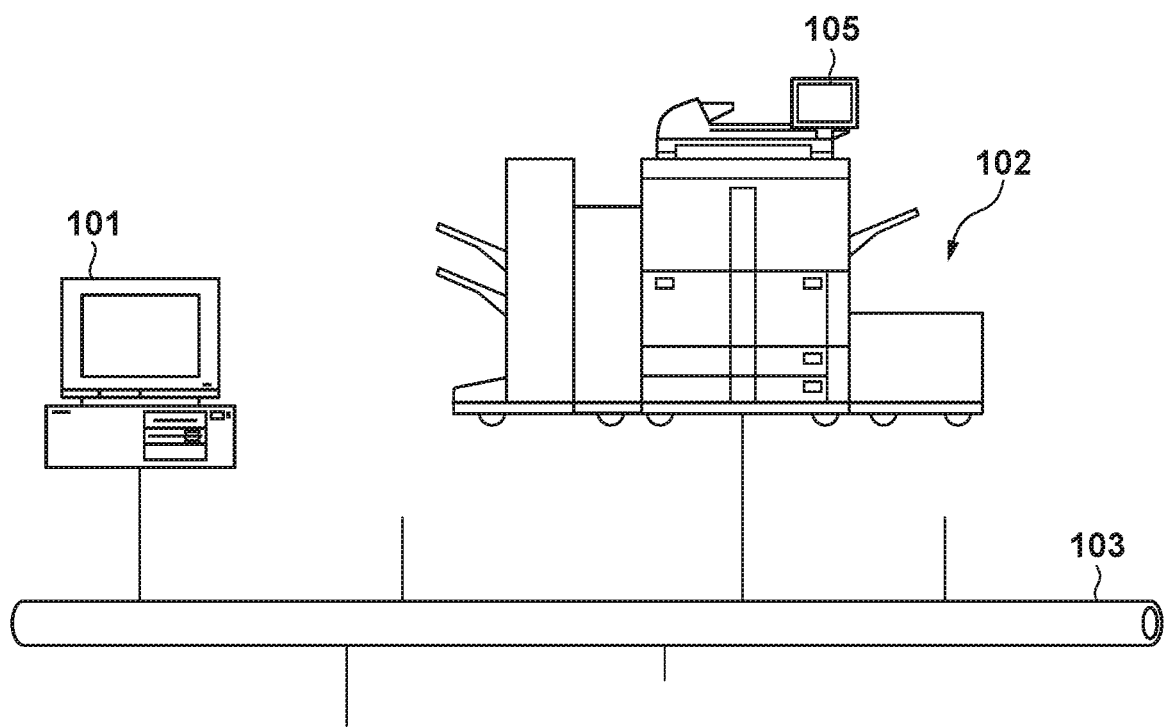
FIG. 1 is a view for illustrating a configuration of a print system in a first embodiment.

FIG. 1 is a view for illustrating a configuration of a print system in a first embodiment.

In this print system, a PC 101 and an image processing apparatus 102 are connected via a network 103. The image processing apparatus 102 is a multifunction processing apparatus (MFP) that prints an image on paper media (sheet) by a known electrophotographic technique. Note, this image processing apparatus 102 is not limited to an MFP, and an LBP (laser beam printer) or an ink-jet method printer may also be used.

The image processing apparatus 102 includes a display unit 105 capable of displaying information. The display unit 105 is a touch panel in which a user is prompted with operation instructions by displaying the information. The display unit 105 can accept various instructions from the user, such as a print environment menu operation instruction, or a change of a print setting and a deletion of a print job.

Also, a card reader 213 (FIG. 2), capable of reading information of an IC card of the user, is connected to the image processing apparatus 102. Also, the image processing apparatus 102 functions as an authentication server that authenticates a user based on the information of the read IC card. Also, the image processing apparatus 102 receives a print job (data) from the PC 101, and functions as a bibliography server that stores the print job (data).

The image processing apparatus 102 manages, as bibliographic information, various job attribute information items such as a color mode, a document name, and user information of the print job received from the PC 101. This bibliographic information is useful in an authenticated print job, which will be described later. Note, in the print system of the first embodiment, although the image processing apparatus 102 includes a bibliography server function and an authentication server function, a print system of a configuration in which separate devices include these functions may be used. In other words, the image processing apparatus 102 may make a request to another apparatus for authentication processing for authenticating a user, and obtain only the results of the authentication processing from the other apparatus.

In the PC 101, when an operation for a print job by any application is performed, a print driver UI is displayed. Then, the PC 101 reflects various print settings that were designated through the print driver UI to generate PDL data. The PC 101 adds user information that identifies the user to the generated PDL data and transmits this information to the image processing apparatus 102 as a print job.

The image processing apparatus 102 allows the user to use the print function after the user is authenticated. When usage of the print function by the authenticated user is designated, the image processing apparatus 102 obtains the bibliographic information of the print job that includes the user information matching to the authenticated user among the print jobs stored. Then, the image processing apparatus 102 causes a list of print jobs of the user that was authenticated to be displayed on the display unit 105 based on the obtained bibliographic information. In other words, the image processing apparatus 102 generates an information list for display on the display unit 105 based on the obtained bibliographic information.

At this point, selecting a particular print job from the list of print jobs displayed on the display unit 105 is possible by the authenticated user operating the display unit 105. When the particular print job is selected, a setting screen of the print job is displayed on the display unit 105. On the setting screen, the user can perform an editing instruction for deleting a print job in units of pages, a print instruction for causing execution of printing, a preview instruction for causing a preview image to be displayed, a setting instruction for changing a print setting, and the like.

Note that in FIG. 1, to easily explain the configuration of the print system, the PC 101 is only connected to the network 103 and the MFP 102. A plurality of terminal apparatuses can, however, be further added to the MFP 102 and the PC 101 and be connected to the network 103. Also, in the first embodiment, the PC 101 that is a generic personal computer is used as an apparatus that transmits print jobs to the image processing apparatus 102. The apparatus that transmits the print jobs may, however, also be a mobile terminal, such as a mobile telephone, or a tablet terminal, for example.

Figure 2:
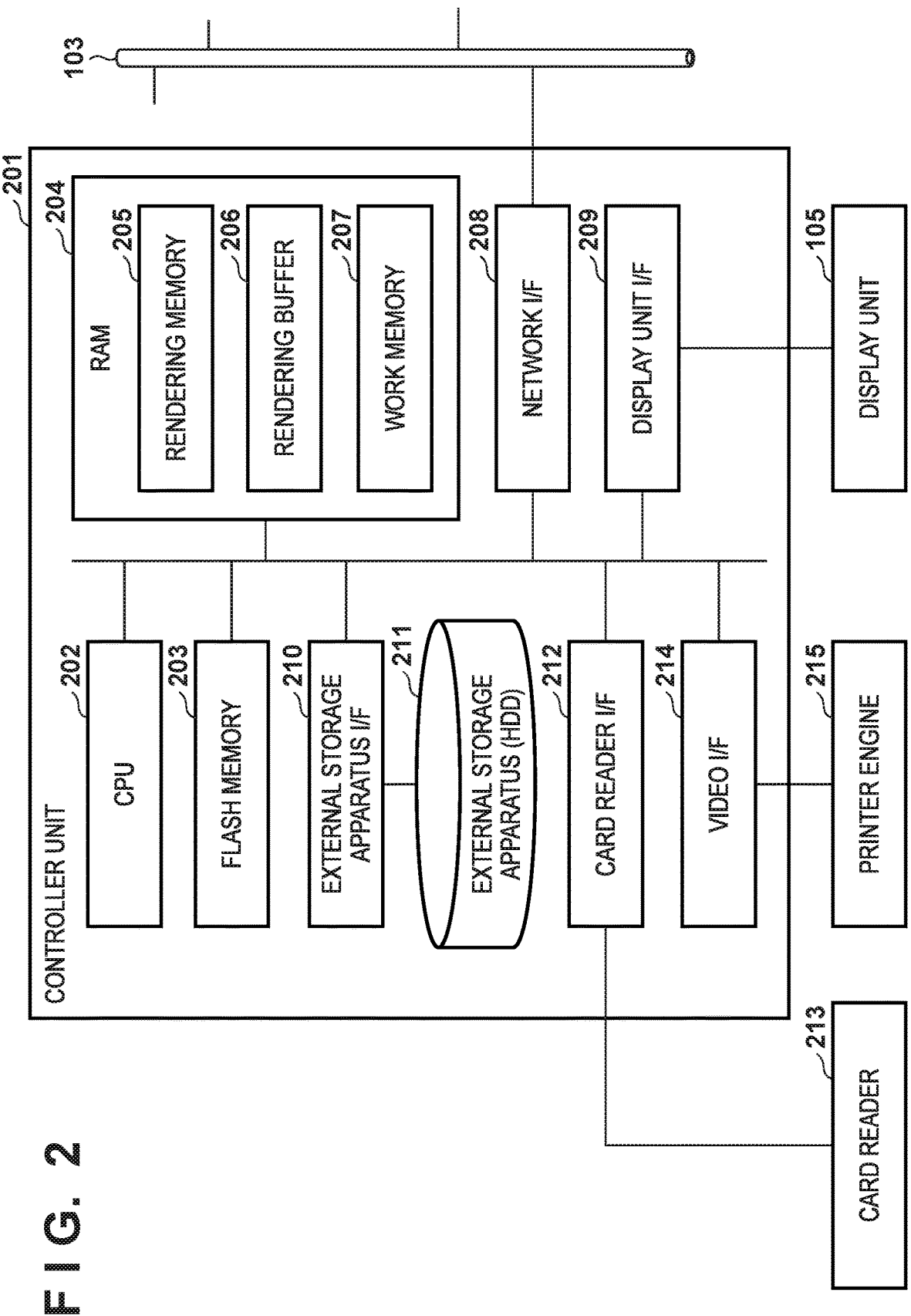
FIG. 2 is a view for illustrating a hardware configuration of an image processing apparatus in the first embodiment.

FIG. 2 is a view for illustrating a hardware configuration of an image processing apparatus 102 in the first embodiment.

Note that in FIG. 2, the same reference numerals are given for configurations identical to FIG. 1, and explanation of these configurations is omitted.

A controller unit 201 is a control unit for comprehensively controlling various configurations of the MFP 102. The controller unit 201 is comprised of a Central Processing Unit (CPU) 202, a flash memory 203, a Random Access Memory (RAM) 204, an external storage apparatus (such as a Hard Disk Drive (HDD)) 211, and the like. Control programs, such as an Operating System (OS), are saved in the flash memory 203 or the HDD 211. The CPU 202 comprehensively controls each configuration of the MFP 102 by loading and executing these control programs in the RAM 204.

The HDD 211 is connected to a bus of the controller unit 201 via an external storage apparatus I/F 210. Also, the HDD 211 functions as a storage unit that stores (saves) a print job received from the PC 101 and bibliographic information, and the like, relating to the print job. A network I/F 208 performs control of transmission and reception of various data with an external apparatus connected via the network 103. The RAM 204 is a volatile memory including a plurality of memory areas, such as a rendering memory 205, a rendering buffer 206, and a work memory 207. Also, regarding the RAM 204, it is possible to load a control program from the HDD 211 by the OS. The work memory 207 functions as a work area of the CPU 202. For example, the work memory 207 is used as the work area of the CPU 202 at a time of analysis, or the like, of the print job. The rendering memory 205 functions as a storage area for storing a rendering object that a print data analyzing unit 304 (FIG. 3) generates by analyzing the print job. The rendering buffer 206 functions as a buffer area that temporarily saves the rendering object when a page image generation unit 305 (FIG. 3) renders the rendering object to generate page image data.

A display unit I/F 209 is a communication unit for connecting the display unit 105 communicably to the controller unit 201. Also, when data for display on the display unit 105 is transmitted from the controller unit 201, the display unit I/F 209 outputs (transfers) the data to the display unit 105. Also, the display unit I/F 209 takes the role of conveying information input via the touch panel of the display unit 105 to the controller unit 201.

A printer engine 215 is connected to the controller unit 201 via a video I/F 214. The printer engine 215 forms an image, based on the page image data generated by the page image generation unit 305 (FIG. 3), onto a sheet by a known electrophotographic technique. Also, the card reader 213 is connected to the controller unit 201 via a card reader I/F 212. When the user information, stored in the IC card of the user, is read by a non-contact wireless communication, for example, the CPU 202 performs authentication of the user based on this user information.

Figure 3:
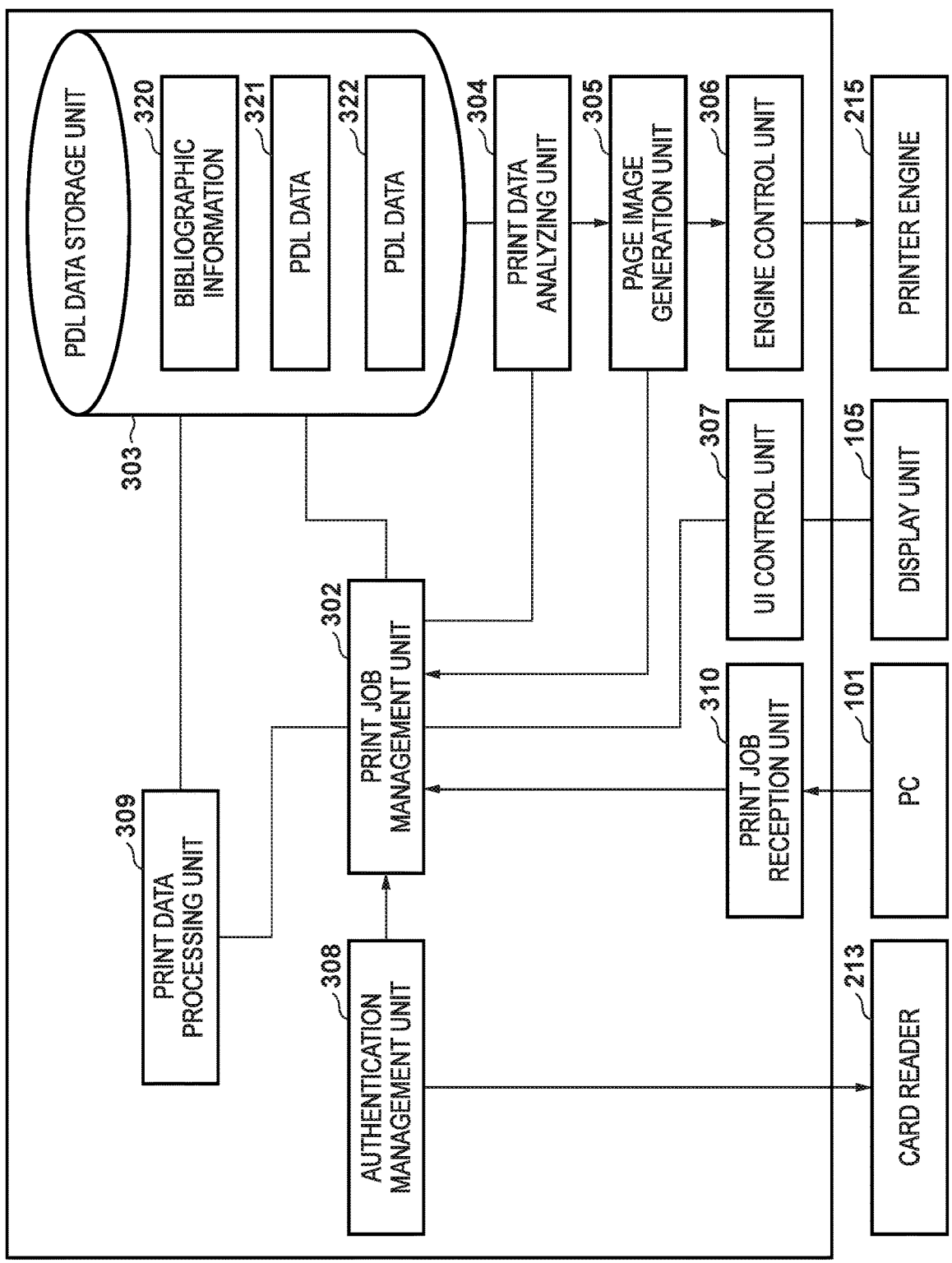
FIG. 3 is a block diagram for describing functions by a CPU in the first embodiment.

FIG. 3 is a block diagram for describing functions by the CPU 202 in the first embodiment. Note that in FIG. 3, the same reference numerals are given for configurations identical to previously described FIG. 2, and explanation of these configurations is omitted.

When a print job reception unit 310 receives a print job from the PC 101, it requests storage (saving) of the PDL data that' configures the print job to a print job management unit 302. A PDL data storage unit 303 is a storage area to which a partition, which is part of the HDD 211, is assigned. The PDL data storage unit 303 temporarily stores a print job as PDL data 321. Also, when the print job management unit 302 causes the PDL data to be stored in the PDL data storage unit 303, it makes a request for an analysis of the PDL data to the print data analyzing unit 304. With this, the print data analyzing unit 304 examines the bibliographic information contained in the print job and extracts the bibliographic information. The print job management unit 302 stores bibliographic information 320 separately from the PDL data 321 in the PDL data storage unit 303.

Next, explanation is given respectively regarding each process that is performed up until the print job, which is stored in the PDL data storage unit 303, is printed by the MFP 102.

When user information is registered beforehand, an authentication management unit 308 performs user authentication processing by collating with user information input by the card reader 213. When user authentication succeeds in the authentication management unit 308, the print job management unit 302 obtains from the HDD 211 the bibliographic information 320 of the print job that includes user information of the authenticated user. Then, the print job management unit 302 generates a list of information of the print job based on the obtained the bibliographic information 320. Next, the print job management unit 302 requests a display of the list of information to a UI control unit 307 so as to display the generated list of information of the print job on the display unit 105. Note that a total number of pages of the print job, page size information, and the like, is also included in the bibliographic information 320 in addition to a job ID for identifying the print job. The total number of pages of the print job and the page size information can be acquired when the print data analyzing unit 304 analyzes the print job.

The UI control unit 307 displays the list of information of the print job on the display unit 105 and accepts a user operation via the touch panel of the display unit 105. A change of a print setting of the print job, an instruction to print the print job, an instruction to preview the print job, and also an instruction for a deletion of the print job, or a deletion of a particular page, or the like, of the print job, are examples of user operation instructions. When a print instruction or a preview instruction for a selected print job is received, the UI control unit 307 requests preview processing or print processing of the print job to the print job management unit 302. When the preview instruction is accepted, the print job management unit 302 makes a request for generation of page images for preview to the print data analyzing unit 304 and the page image generation unit 305. The print job management unit 302 in sequence receives image data of generated pages for preview.

When the print instruction is accepted, the print job management unit 302 confirms whether or not an instruction for page deletion and for a change of a print setting was made. Then, if the above described instructions are confirmed, the print job management unit 302 makes a request for processing of the PDL data 321 to a print data processing unit 309 based on the instruction contents. The print data processing unit 309 processes the PDL data 321 in accordance with a page deletion instruction or a print setting change instruction. Thus, the print data processing unit 309 processes the PDL data 321 in accordance with the instruction contents and generates PDL data 322 as the result. Subsequently, the print job management unit 302 makes a request for generation of page image data based on the PDL data 321 or the PDL data 322 to the print data analyzing unit 304 and the page image generation unit 305. Then, an engine control unit 306 outputs the generated page image data as a video signal to the printer engine 215. As a result, printing is executed in the printer engine 215.

Note, whether page image data based on the PDL data 321 is printed or whether page image data based on the PDL data 322 is printed is determined depending on an existence or absence of the page deletion instruction and the print setting change instruction. Specifically, without a page deletion instruction or a print setting change instruction, the page image data based on the PDL data 321 is generated and printed. Meanwhile, if there is a page deletion instruction or a print setting change instruction, the print job management unit 302 generates and prints the page image data based on the PDL data 322.

Using the flowchart of FIG. 15, the foregoing processing is explained as follows.

When a power supply is input to the MFP 102, the display unit 105 is lit and a state in which operation is possible is entered. The CPU 202 first causes an authentication screen (not shown) for authenticating a user to be displayed on the display unit 105. When user authentication succeeds, the CPU 202 causes a menu screen (not shown) for selecting a function of the MFP 102 to be displayed on the display unit 105. A print function can be selected on the menu screen. When a print function is selected, the CPU 202 displays a list of jobs (print data) stored in the MFP on the display unit 105. A job that is desired to be printed can be selected from the job list. When a job is selected, the CPU 202 displays a print instruction screen (not shown) for instructing printing of the job on the display unit 105 (step S1501).

Whether to print the data without processing or whether to process and then print the data can be selected on the print instruction screen. In a case in which the user selects to edit a job (step S1502: YES), the CPU 202 causes an editing screen to be displayed on the display unit 105. A user editing instruction can be accepted on the editing screen (step S1503). After editing ends, the CPU 202 receives the print instruction from the user (step S1504). Then, the CPU 202 performs processing of the PDL data based on the editing instruction (step S1506). The CPU 202 generates the image data based on the processed PDL data (step S1507). Then, the CPU 202 causes an original to be output to the printer engine 215 (step S1508) based on the generated image data.

If the user does not edit the job (step S1502: NO), the CPU 202 receives the print instruction from the user (step S1505). The CPU 202 generates the image data based on the unprocessed PDL data (step S1507). Then, the CPU 202 causes an original to be output to the printer engine 215 (step S1508) based on the generated image data.

Figure 4:
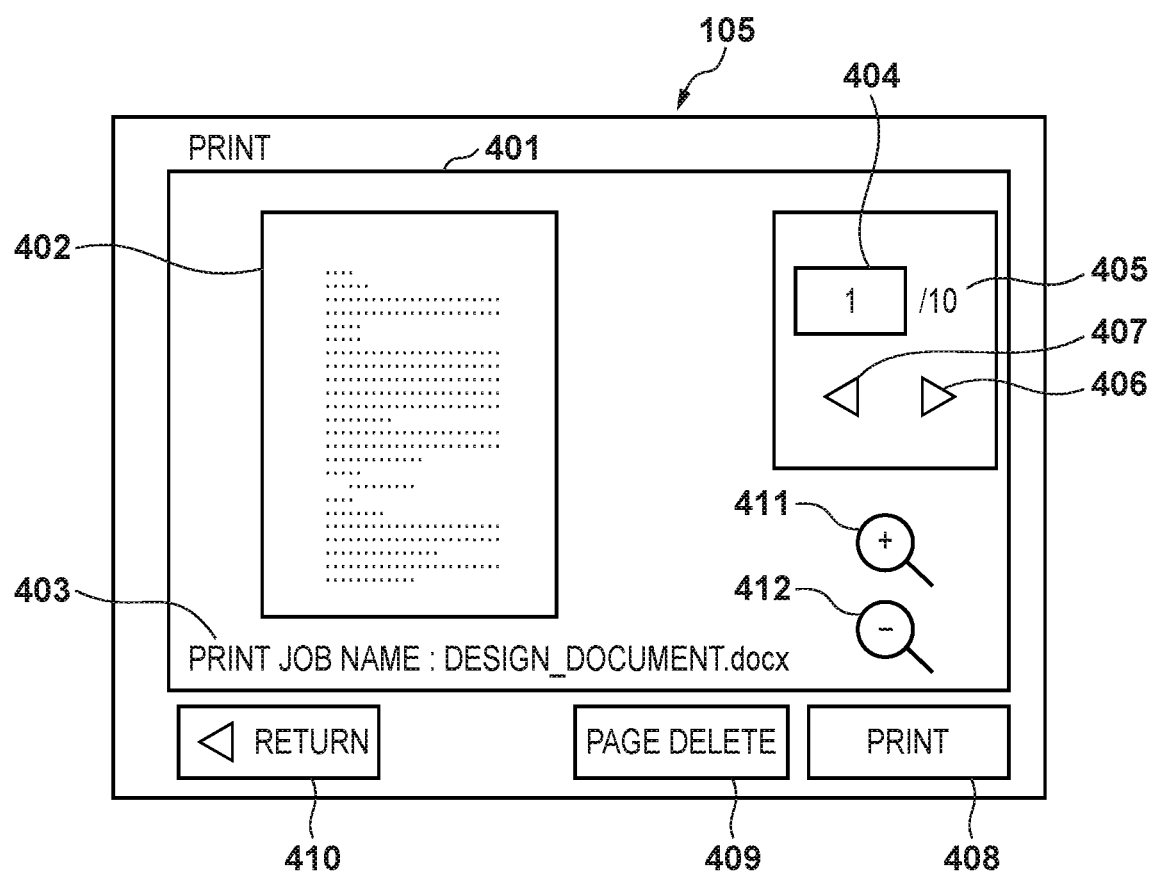
FIG. 4 is a view for illustrating a state of a preview screen in the first embodiment.

FIG. 4 is a view for illustrating a state of a preview screen in the first embodiment. Note, this screen is a screen that is displayed on the display unit 105 after a preview instruction is made corresponding to the selected print job on a screen for listing the print jobs (not shown).

A preview display area 401 is an area in which a preview image 402 arranged on the display unit 105 is displayed. A print job name 403 is a name of the print job that is a target for preview that is acquired from the bibliographic information 320 of the print job. In accordance with FIG. 4, it can be seen that the print job is a job for printing "design_document.docx". A total number of pages 405 of the print job indicates the total number of pages of the print job acquired from the bibliographic information 320 of the print job. A page number 404 indicates the number of a page that is being displayed in the preview as the preview image 402. Although the information displayed on the preview screen of the present embodiment is defined as above, other print job attributes, and the like, may be displayed other than this information.

Also, a plurality of selection objects are arranged for accepting an instruction of a user on the preview screen. Scroll buttons 406 and 407 are buttons (selection objects) for instructing movement of a target page that is preview-displayed to a previous/succeeding page. A button 411 is a button for instructing magnification of the preview image 402. A button 412 is a button for instructing reduction of the preview image 402.

On the bottom part of the screen, a print button 408, a page delete button 409, and a return button 410 are displayed. The print button 408 is a button for instructing printing of an image being previewed. The page delete button 409 is a button for instructing deletion of a page displayed on the preview image 402. The return button 410 is a button for instructing to end the preview display, and return to the previous screen.

When the page delete button 409 is pressed, the UI control unit 307 accepts an instruction to delete to a page. Then, the UI control unit 307 temporarily stores a page number that is the deletion target, in other words, the number 404 of the page displayed on the preview image 402 to the work memory 207. The page that is the preview target is switched by the scroll buttons 406 or 407, and if the page delete button 409 is pressed, the number of the page that is the deletion target is added and stored whenever that is done. In the first embodiment, the number of the pages that are deletion targets are stored as a one-dimensional array whose elements are the page numbers. Also, the UI control unit 307 sorts the page numbers in ascending order in accordance with the pressing of the print button 408 or the return button 410.

When a user presses the print button 408, the UI control unit 307 makes an instruction for print processing to the print job management unit 302. Here, the print job management unit 302 performs processing for deletion of a target page if the above array for storing the page numbers targeted for deletion is not empty. Note, even if the print button (not shown) is pressed by the user after the return button 410 is pressed and the screen for listing the print jobs is returned to, the UI control unit 307 makes an instruction for the print processing to the print job management unit 302. Note, an image for preview (image data) cannot be used for printing because it is of a lower resolution. Because of this, the image for preview is deleted accompanying the print instruction.

FIG. 5 is a view for illustrating a data configuration of a print job in the first embodiment.

The print job according to a first embodiment is data of a format in which a job control language is added to a PDL data portion generated by a print driver in accordance with an application instruction in the PC 101. As illustrated in FIG. 5, the job control language includes a job control header portion 501 and a job control footer portion 503, and these are described so as to surround a PDL data portion 502. In other words, the job control language and the PDL data portion 502 configure a single print job.

Note that, in the first embodiment, the job control language conforming to a PJL (Printer Job Language) that Hewlett-Packard developed is illustrated as an example of a job control language used in a print job. The print job used in the present invention is not limited, however, to this type of print job, and a print job that uses another control language may be used.

"<ESC>" in the figure represents an escape sequence ("0x1B" in base 16) and instructs a transition to a PJL mode by combination of predetermined character sequences. More specifically, when the print data analyzing unit 304 finds "<ESC>%-12345X" (UEL) within the print data, in a case in which PDL data that is currently being processed exists, it ends the PDL analysis processing and transitions to the PJL mode.

Regarding "@PJL", various instructions for job control, such as designation of a PDL type or a print setting for a time of PDL processing, are performed by subsequent combinations of character sequences. Here, single items are delimited by a line feed code "{1f}" ("0x0A" in base 16). For example, "@PJL JOB {1f}" in the figure declares start of a PJL job. Also, "@PJL ENTER LANGUAGE=PDL1{1f}" designates "PDL1" as the PDL type. Here, although brief explanation is given regarding the job control language, other various print settings or instructions are performed in an actual print job. "PJL SET JOBATTR="Owner=A111"{1f}" indicates that an owner of the print job is "A111" and the print job management unit 302 identifies owner information of the print job as user information.

Finally, "<ESC>%-12345X" (UEL) included in the job control footer portion 503 indicates an end of the PDL analysis processing. Then, the end of the PJL job is declared by "@PJL EOJ{1f}".

Next, a simple explanation is given regarding the PDL data portion 502. Note, details will be described later with reference to FIGS. 6A to 6C. In the first embodiment, in addition to commands representing a hierarchical structure of a job and pages, various commands for designating a color mode, performing processing for rendering characters/images/graphics, or the like, are included in the PDL data portion 502. The instruction content for various commands is described by parameters. For example, a resolution indicating a unit of description for PDL is described as a parameter in a job start command ("BeginJob" in the figure).

Next, explanation will be given for a processing procedure for when the print data processing unit 309 deletes PDL data corresponding to a page that is a deletion target. Also, detailed examples of PDL data processed by the processing for deletion will be explained with reference to FIGS. 6A to 6C and the flowchart of FIG. 7.

Figure 6A:
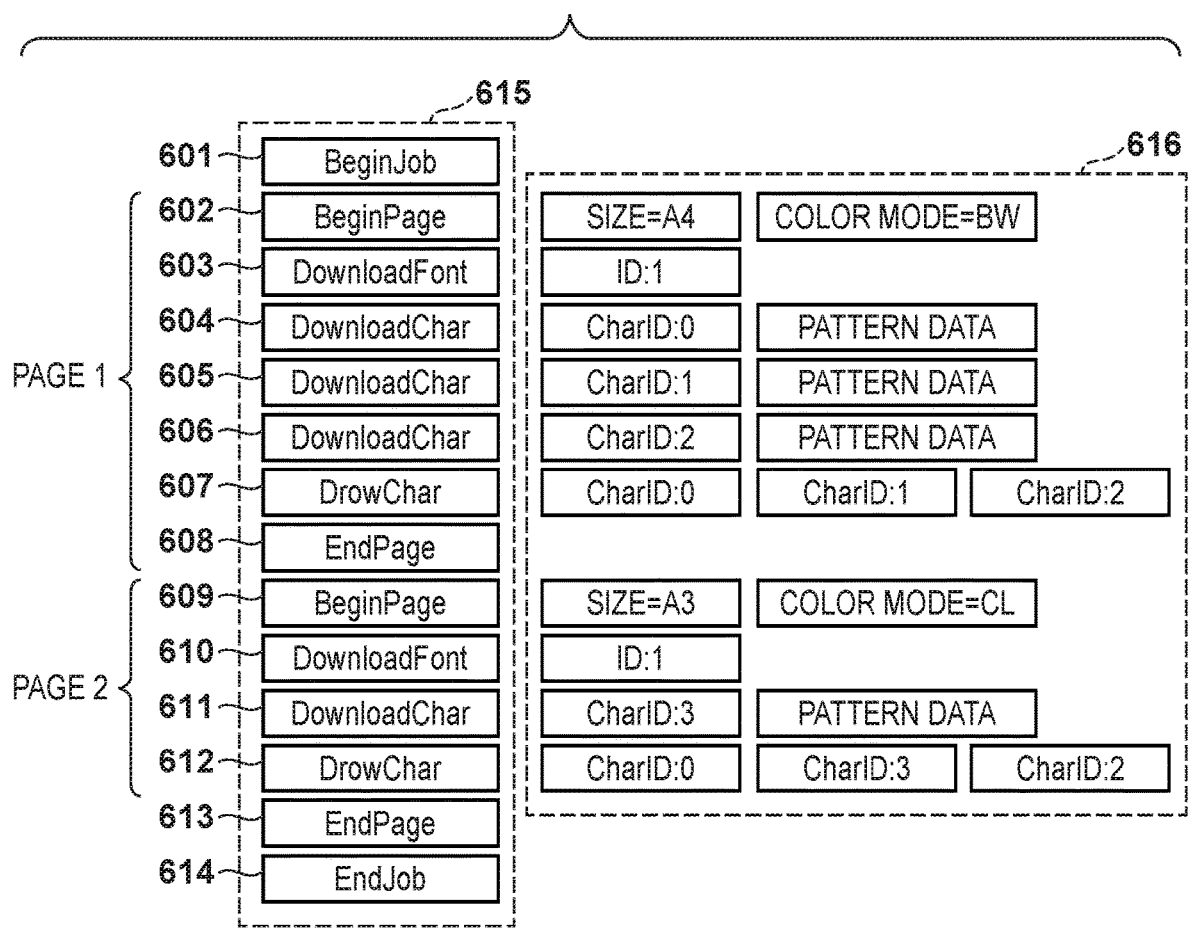
FIG. 6A illustrates a PDL data command configuration prior to editing in the first embodiment.
Figure 6B:
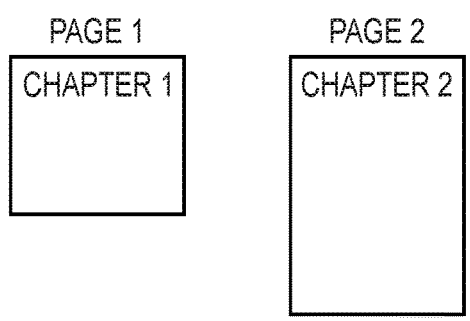
FIG. 6B illustrates a print result.
Figure 6C:
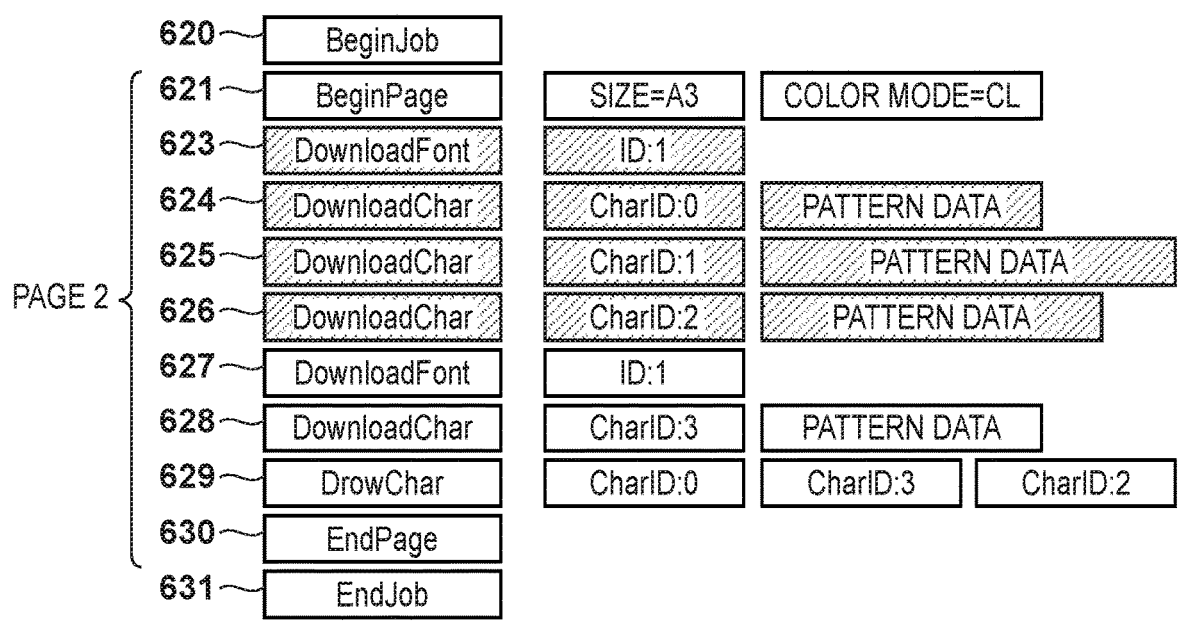
FIG. 6C illustrates a PDL data command configuration following editing.

FIG. 6A is a view for illustrating a PDL data command configuration prior to editing in the first embodiment. FIG. 6B is a view for illustrating a print result. FIG. 6C is a view for illustrating a PDL data command configuration following editing.

First, the PDL data 321 includes a command group 615 and a parameter group 616 as a data structure, as illustrated in FIG. 6A. The command group 615 is predefined based on a PDL language specification. The parameter group 616 defines instruction content by each command being added thereto. Alternatively, the parameter group 616 indicates details of rendering data. Each item of the parameter group 616 is described based on the PDL language specification. In the parameter group 616, there exist items that need to be input and items for which input is optional. Whether or not input is essential varies depending on commands. In the items for which input is optional, initial values are determined and the initial values are overwritten by optional values as necessary.

In the first embodiment, PDL data of two pages sandwiched between a command "BeginJob" 601 and a command "EndJob" 614 that indicate a PDL job start and an end form a hierarchical structure. PDL data of the first page is from a page start command "BeginPage" 602 that indicates the start of the page description until a page end command "EndPage" 608 that forms a pair therewith and indicates the end of the page description.

PDL data of the second page is from a page start command "BeginPage" 609 that indicates the start of the page description until a page end command "EndPage" 613 that forms a pair therewith and indicates the end of the page description. Then, within these page structures, a group of commands that are used in various rendering processing are included.

Within each page structure, font data that is a resource is registered (downloaded) in the HDD 211, and a command group for printing is indicated. To be specific, "DownloadFont" 603, "DownloadChar" 604 through 606, and "DrawChar" 607 are included for page 1. With "DownloadFont", a font header that is shared data, and an ID for designating a font is used as a parameter. With "DownloadChar", pattern data for expressing a glyph shape, and CharID for specifying a character are used as a parameter in order to register font data in units of characters. Then, registered character patterns are printed by a command "DrawChar" 607 that has the CharID as a parameter. Herein, a command group for which font data for printing such characters is registered and deleted will be called resource control commands. Resource control commands do not, however, include "DrawChar".

In the PDL illustrated in the first embodiment, the registered font data is valid across a plurality of pages until an explicit deletion instruction is made by a command, or the job end command is issued. This is called "resource inheritance level is job". For example, when font ID=1 is designated for "DownloadFont" 610 in page 2, the same FontSet command as page 1 is issued and the font registered in page 1 is made to be a target for processing. After this, when the character of CharID=3 is additionally registered in "DownloadChar" 611, the characters (CharID=0, 3, 2) that are registered in pages 1 and 2 are printed by command "DrawChar" 612.

Note, in actuality, although it is normal to designate various parameters, such as character size, print direction, print color, or qualification designation, here, such explanations are omitted for simplicity.

As indicated here, in a case of the "resource inheritance level is job", the characters registered by the resource control commands (CharID=0, 1, 2) can even be referenced within a subsequent page and printed.

FIG. 6B is a schematic diagram for illustrating an example in which the PDL data illustrated in FIG. 6A is used and printed. In FIG. 6B, results in which three characters "第1章 (Chapter 1)" are printed on page 1 and three characters "第2章 (Chapter 2)" are printed on page 2 are illustrated. Here, both characters "第" and "章" correspond to CharID=0 and CharID=2, respectively, and the resources are shared by each of the pages. Also, the character "1" corresponds to CharID=1 and the character "2" corresponds to CharID=3.

FIG. 6C illustrates an example configuration of commands after a deletion of page 1 is executed. According to FIG. 6C, the two "BeginPage" commands described in FIG. 6A become one, and the two "EndPage" commands described in FIG. 6A become one.

Specifically, the result is that page 1 was deleted and only page 2 remains in the job data. Accordingly, this job data is configured by PDL data of one page sandwiched between a command "BeginJob" 620 and a command "EndJob" 631 that indicate a PDL job start and an end. In other words, in the configuration of this job data, a command "BeginPage" 621 and a command "EndPage" 630, which respectively indicate a start and an end of a page description, are paired in a single page structure. Then, within these page structures, a group of commands that are used in various rendering processing are included. Within this command group, commands 623 through 626 that correspond to the resource control commands 603 through 606 of FIG. 6A are included. In other words, in the job data, the resource control commands 603 through 606 of the deleted page 1 are transplanted as commands 623 through 626 in page 2.

"DownloadFont" 623, similarly to the font registration of "DownloadFont" 603, designates that font ID=1 and issues a FontSet command. The same characters as "DownloadChar" 604 through 606 are registered for "DownloadChar" 624 through 626. The same font as "DownloadFont" 610 is registered by "DownloadFont" 627. The character of CharID=3 additionally registered by "DownloadChar" 628 is the same as "DownloadChar" 611. Also, the characters registered in pages 1 and 2 (CharID=0, 3, 2, specifically, " 第2章 ") are printed by a command "DrawChar" 629.

By the print data analyzing unit 304 analyzing the PDL data processed into the data structure as illustrated in FIG. 6C, only page 2 is printed, and an instruction to delete page 1 is realized. Note, the resource registered by the command 605 of FIG. 6A (CharID=1) is referenced only in page 1 and not referenced in page 2. For this reason, when page 1 is deleted, it is not necessary to register the same resource in the command 625 (CharID=1). For this reason, in a case in which reduction of the size of the PDL data is desired, the resource 605 can be deleted. So that a problem does not occur when a resource is deleted, however, it is necessary that referents of the resource be specified. In the resource specification, processing for analyzing the PDL data is necessary and cumbersome. Accordingly, as described above in the present embodiment, by leaving the resource regardless of whether or not it is unnecessary, the PDL data process for processing is accelerated.

Figure 7:
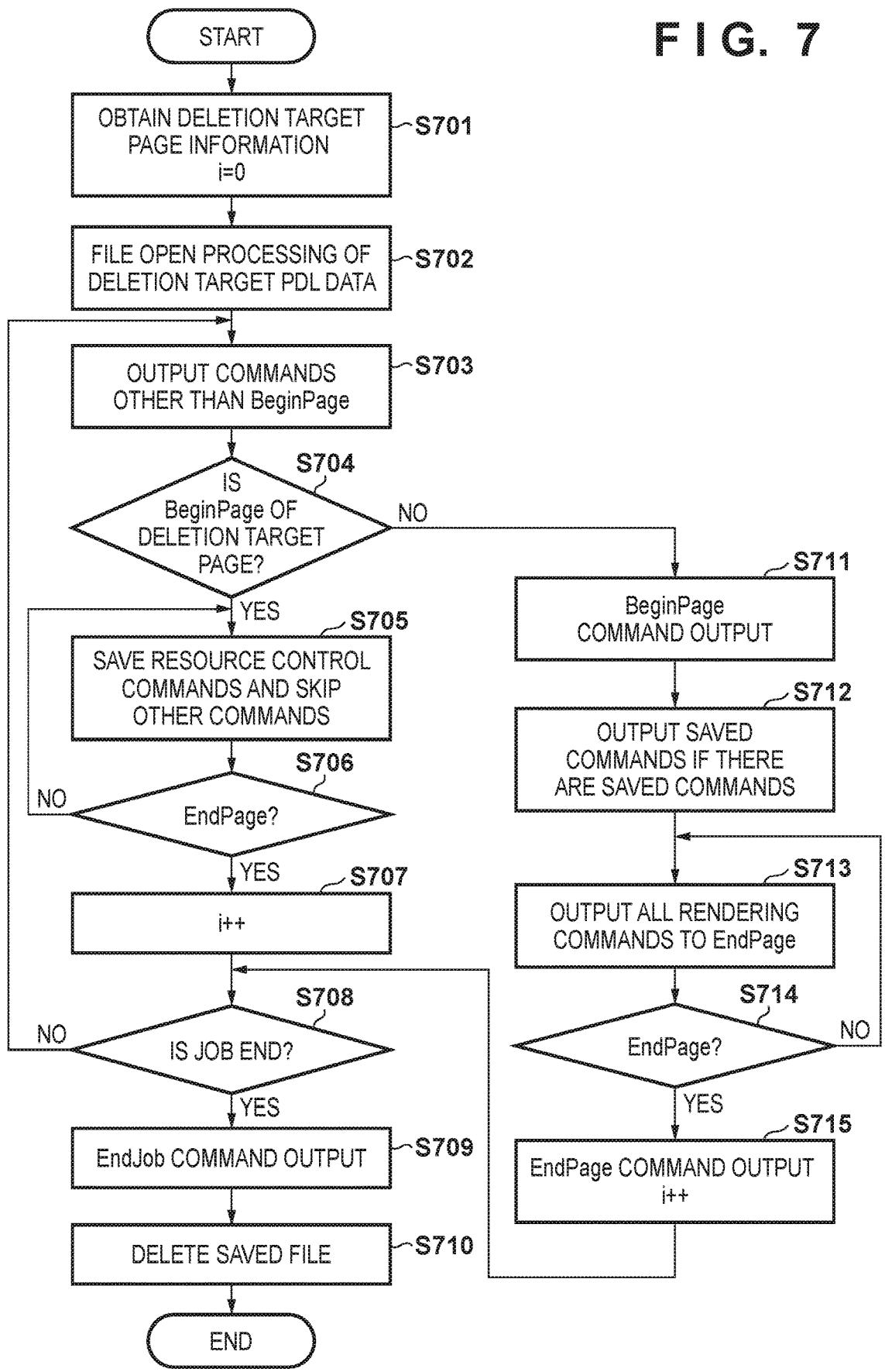
FIG. 7 is a view for illustrating a flowchart of page deletion processing in the first embodiment.

FIG. 7 is a view for illustrating a flowchart of page deletion processing in the first embodiment. Note, a program that executes this process is stored in the flash memory 203 or the HDD 211. Also, the program is loaded to the RAM 204 and is executed under the control of the CPU 202. In this way, the process illustrated in the flowchart of FIG. 7 is achieved. As described above, the CPU 202 functions as each functional unit as illustrated in FIG. 3 by executing the program. Herein, the processing procedure of the flowchart is described based on the relationship with each functional unit.

When the processing is started, the CPU 202 functioning as the print data processing unit 309 obtains deletion target page information from the print job management unit 302, stores it to the RAM 204, and manages it (step S701). The deletion target page information is a total number of deletion target pages and an array in which deletion target page numbers are saved. Herein, if the PDL data of page 1 as illustrated in FIGS. 6A to 6C, for example, is processed, the CPU 202 will receive an array that has a single element in which a page number "1" is saved, and a page total number "1" that is the number of elements in the array. Also, the CPU 202 initializes a variable i for managing a processed number of pages to "0". The variable i is stored in the RAM 204. Next, the CPU 202 advances processing to step S702.

The CPU 202 functioning as the print data processing unit 309 performs open processing to be able to access the PDL data 321, which is a target of processing for page deletion and which is stored in the PDL data storage unit 303, as a file. Note, the print job management unit 302 specifies the PDL data, which is the target of processing for deletion, by a file path name for internal management of the MFP 102.

The CPU 202 performs the processing for deletion by editing the page structure of the PDL data 321 while referencing the deletion target page information in processing from step S703.

The print data processing unit 309 analyzes the PDL data and outputs all commands unchanged until the BeginPage command is detected (step S703).

The print data processing unit 309 determines whether the page currently being processed (i+1) exists within the array of the deletion target page information, in other words, whether the BeginPage command of the page targeted for deletion is found (step S704), and when determined to be found, the processing proceeds to step S705.

The print data processing unit 309 performs a skip process as the deletion target page (step S705). Specifically, until the EndPage command of this page is found (until a determination of step S706 becomes Yes), the print data processing unit 309 temporarily saves a resource control command to a file for work of the PDL data storage unit 303 and skips other commands.

For example, as illustrated in FIG. 6A, the print data processing unit 309 saves the resource control commands 603 through 606 of page 1 and skips the other commands of page 1.

Then, when the print data processing unit 309 detects the EndPage command in step S706, processing proceeds to step S707. The print data processing unit 309 increments the variable i indicating the number of pages processed, ends processing of the one page, and advances the processing to step S708.

The print data processing unit 309 determines whether or not the next command is an EndJob command (step S708), otherwise, processing returns to step S703 for processing subsequent pages.

Meanwhile, if the print data processing unit 309 determines that the BeginPage command detected in step S704 is not the deletion target page, processing proceeds to step S711. Then, the print data processing unit 309 outputs the BeginPage command, and advances the processing to step S712. In step S712, if saved resource control commands are present, the print data processing unit 309 consecutively outputs the saved commands. In step S713, the print data processing unit 309 consecutively outputs the all rendering commands to end page. In other words, as illustrated in FIG. 6C, the print data processing unit 309 outputs the saved resource control commands 603 through 606 as the resource control commands 623 through 626 in page 2 that is not a page targeted for deletion. In this way, when the file size of the file for work becomes "0", the print data processing unit 309 determines that there are no more saved commands. The print data processing unit 309 executes the processing until the EndPage command is detected in step S714. When the print data processing unit 309 detects the EndPage command, it advances processing to step S715. In step S715, the print data processing unit 309 outputs a PageEnd command and increments the variable i (a counter of processed number of pages), and processing proceeds to step S708.

In step S708, the print data processing unit 309 determines whether or not the EndJob command is detected, in other words, whether or not the end of a job is detected. Also, when the print data processing unit 309 detects the end of a job, processing proceeds to step S709, and, when this is not the case, processing proceeds to step S703. In step S709, the print data processing unit 309 outputs the EndJob command and processing proceeds to step S710. Then, the print data processing unit 309 deletes the file for work used for the saving of the resource control command and the processing ends.

At this point, the print job management unit 302 adds the PDL data 322 output by the above process to the bibliographic information 320 and manages it as PDL data for which the page deletion processing is completed. Then, the PDL data 322 is used to form an image (print) to a printing material.

Note, there is a concern that available storage capacity of the PDL data storage unit 303 may be insufficient in a case of an attempt to process PDL data that includes a large number of resource control commands. In this case, normally saving resources as a file for work cannot be done, so performing error processing is desirable. If the error processing is performed, interrupting a process for processing of the PDL data, displaying an error message on the display unit 105, and ending the processing is desirable.

As described above, according to the first embodiment, it is possible to efficiently apply deletion processing of a particular page to the PDL data that includes resources that are used across pages. Specifically, in the PDL data of a language specification is "resource inheritance level is job", it is possible to delete pages including resources that are referenced by another page, and to reduce the influence on other pages.

Second Embodiment

In the foregoing first embodiment, the resource control commands included in the deletion target page are saved (spooled) to a temporary file for work, and, immediately after the start of processing for a subsequent page, those saved commands are inserted into that subsequent page. Depending on the language specification of the PDL, however, page deletion can be performed without saving to the file for work. In other words, in the case in which the parameters of the page start command are of a fixed length, or it is a PDL for which a maximum size can be specified, it is possible to output PDL data from which a particular page is deleted without spooling the resource control commands described in the deletion target page.

Accordingly, in the second embodiment, by first outputting the page start command (BeginPage) of the page targeted for deletion as a dummy, the resource control commands of the page targeted for deletion are output. After this, parameters of a page start command of a subsequent page that is not a deletion target are overwritten into the page start command of the page targeted for deletion. Herein, details of the second embodiment will be described with reference to FIGS. 8A to 8C and FIG. 9. Note, because the configurations of the PC 101, the image processing apparatus 102, and the print system according to the second embodiment are the same as the previously described first embodiment, explanation thereof will be omitted.

FIG. 8A is a view for illustrating a configuration of a page start command in a second embodiment. FIG. 8B is a view for illustrating a configuration of PDL data. FIG. 8C is a view for illustrating a configuration of a post-editing page start command.

In FIG. 8A, byte expression 801 indicates byte expressions of parameters or commands. Each byte expression is assigned a numeric value of 1 byte in advance based on a language specification. In the second embodiment, <0x02> (base 16) indicates a BeginPage command, and <0xe7> indicates a parameter of "image area size" attached to the BeginPage. This BeginPage command 807, takes 5 parameter types as indicated by commands 808.

Parameter example 802 indicates an example of a value designated as a parameter, and a number or type of a parameter value is determined for every type of parameter in advance by the language specification. For example, for parameters of the "image area size", two numeric values expressing a size of a page area are described in units of (1/print resolution) inches, and values of a maximum of 4 bytes are taken. This is indicated by size information 805.

Meaning information 803 describes the meanings of each parameter. Here, "image area size", "image direction", "orientation", "origin point", and "color mode" are included. Optional/essential information 804 indicates whether or not each parameter is essential, and here, parameters orientation <0xd2>, origin point <0xd3>, and color mode <0xd4> are indicated as optional parameters. In other words, if the parameters orientation <0xd2>, origin point <0xd3>, and color mode <0xd4> are not designated, values indicated in initial value 806 are recognized as initial values. The size information 805 indicates a size of each parameter (byte number), and the image area size and the origin point are a maximum of 4 bytes and other parameters are 1 byte. The initial value 806 is set for the orientation, the origin point, and the color mode, and these are respectively set to orientation 0 (vertically long), origin point (0, 0), and 0 (black and white).

FIG. 8B illustrates an example in which BeginPage commands of 2 pages are designated based on the language specification of FIG. 8A.

Parameters 810 of page 1 and parameters 812 of page 2 respectively are supplemented for a BeginPage command 809 of page 1 and a BeginPage command 811 of page 2. Here in page 1, the two parameters of the color mode and the origin point are omitted, and the image area size is A4, the image direction is 0°, and the orientation is vertically long. Also, regarding the parameters of page 2, the image area size is A3, the image direction is 90°, the orientation is horizontally long, the origin point is (0x78, 0x78), and the color mode is (color).

FIG. 8C illustrates an example of a page start command that the print data processing unit 309 outputs as a dummy temporarily when page 1 of the PDL data having the configuration of the page start command illustrated in FIG. 8B is to be deleted. Here, the parameters 810 designated by the BeginPage command 809 of page 1 are output as unchanged values within the PDL data 322 as indicated by parameters 814. On the other hand, the two parameters of the origin point and color mode omitted in page 1 are set to initial values and are output as indicated by parameters 815. At this time, so that a parameter, for which the data size can be variably designated depending on a value (the origin point for example), can be rewritten only within the BeginPage command when overwritten by the value of page 2, it is output after having performed a type conversion to the maximum data size. For example, although the values of each coordinate (x, y) in the PDL data prior to processing are described by 1 byte (a total of 2 bytes), a parameter "origin point" is output by a total of 4 bytes, such as (0x0000, 0x0000), because values that can be taken in the language specification are a maximum of 2 bytes.

As described above, the BeginPage command of the page targeted for deletion is output temporarily as a dummy, and the BeginPage command of the page targeted for deletion is overwritten by a BeginPage command of a subsequent page not targeted for deletion. Because of this, it ceases to be necessary to save the resource control commands included in the page targeted for deletion. At this time, for parameters of a subsequent page not targeted for deletion that are to be overwritten, those of a variable size type are converted to the maximum size, and overwritten.

Figure 9:
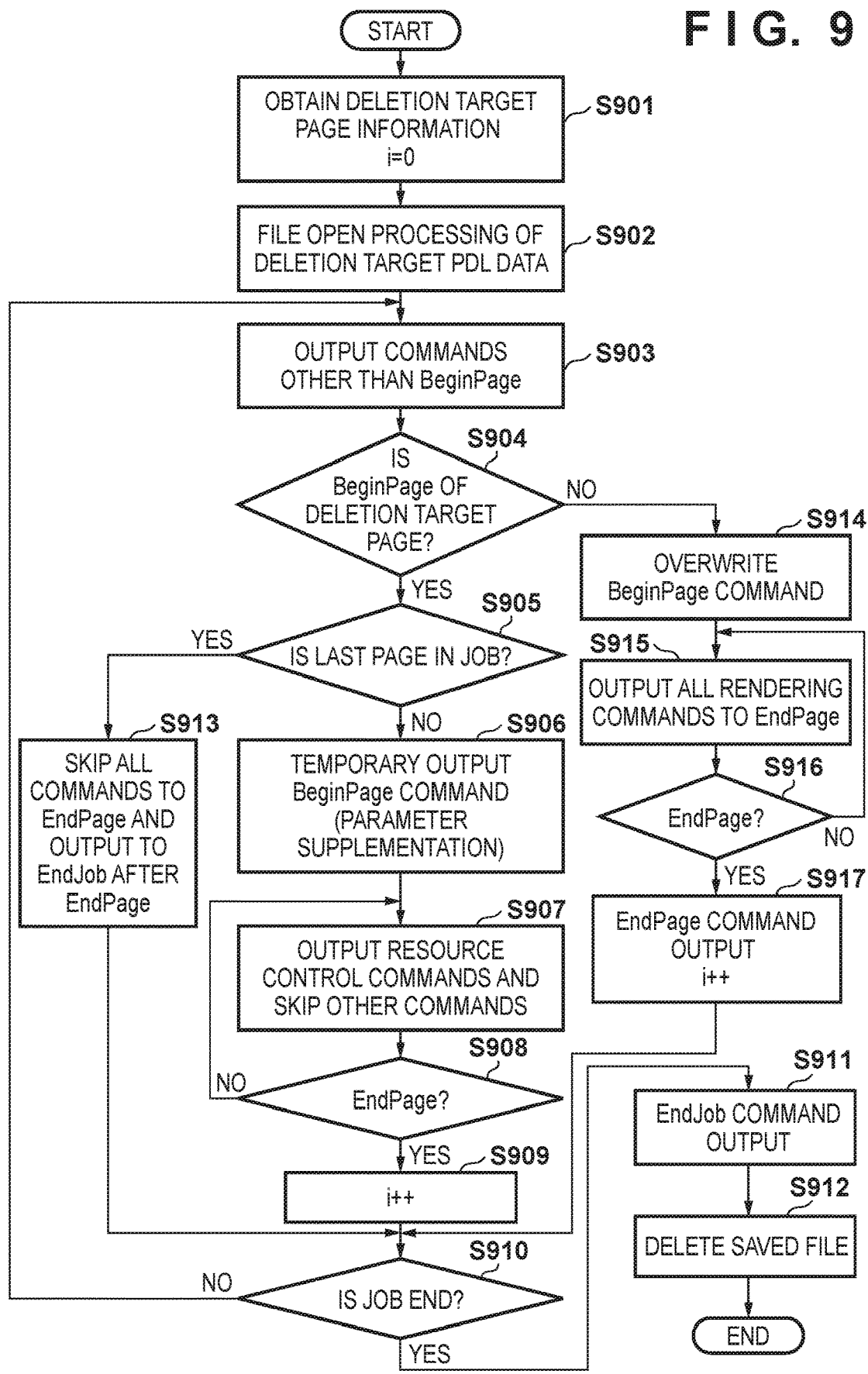
FIG. 9 is a view for illustrating a flowchart of page deletion processing in a second embodiment.

FIG. 9 is a view for illustrating a flowchart of page deletion processing in the second embodiment. Note, a program that executes this process is stored in the flash memory 203 or the HDD 211. Also, the processing illustrated by this flowchart is achieved by this program being loaded into the RAM 204 and executed under the control of the CPU 202. As described above, the CPU 202 functions as each functional unit as illustrated in FIG. 3 by execution of a program. The processing procedure according to the flowchart will be explained using each functional unit.

Note, in FIG. 9, processing of step S901 through step S904, step S907 through step 909, step S910 through step S912, and step S915 through step S917, is the same as the processing of step S701 through step S704, step S705 through step S707, step S708 through step S710, and step S713 through step S715, respectively, of FIG. 7, so an explanation for each of these steps is omitted.

In the second embodiment, the print data processing unit 309 determines whether or not a BeginPage command of a page targeted for deletion is detected in step S904. Then, when the BeginPage command of the page targeted for deletion is detected, processing proceeds to step S905. In step S905, the print data processing unit 309 determines whether or not the page targeted for deletion is the final page of a print job by comparing the number of pages processed that is the variable i to the bibliographic information. Here, it is assumed that the total number of pages of the print job are included in advance in the bibliographic information 320 according to the analysis process of the print data analyzing unit 304, but the print driver that generates PDL data may also cause it to be included in the print job attributes in advance.

In step S905, in a case in which the print data processing unit 309 determines the page targeted for deletion is the final page of the print job, processing proceeds to step S913. Then, the print data processing unit 309 skips all commands (including the EndPage) until the EndPage command is found. If there are subsequent commands up until the EndJob command, the print data processing unit 309 will output them. Here, various reset commands, and the like, correspond to commands issued after the EndPage of the final page. In such a case, the end of the job is always determined in the following step S910 because the subsequent command is EndJob.

Meanwhile, in step S905, when it is determined that the page targeted for deletion is not the final page within the print job, the print data processing unit 309 outputs the BeginPage command of the page targeted for deletion as a dummy while supplementing the parameter sizes as illustrated in FIG. 8C. Next, in step S907 through step S909, similar to the first embodiment previously described, the print data processing unit 309 outputs only resource control commands included in the page targeted for deletion until EndPage. At this time, the print data processing unit 309 stores byte positions from the head of the PDL data of the command that was output as the dummy to work memory because the command that was output as the dummy will be overwritten by a BeginPage command of the subsequent page.

Also, in step S904, if BeginPage of a page not targeted for deletion is detected, the processing proceeds to step S914, and the print data processing unit 309 overwrites portions of the BeginPage command of the dummy that was output with parameters of the page currently being processed and outputs this.

According to the second embodiment as described above, the PDL data of a particular page can be deleted without saving resource control commands included in the page structure that is targeted for deletion. Accordingly, processing for page deletion can be realized without putting pressure on the work area of the PDL data storage unit 303.

Third Embodiment

The previously-described print data processing unit 309 described in the first and second embodiments realizes processing for deletion of a particular page by deleting, or overwriting with a subsequent page, a page structure of a page targeted for deletion. The present invention is not limited, however, to this processing, and it can be realized even by controlling so as not to output a blank sheet at a time of printing while leaving the page structure as is.

In conventional image processing apparatuses, as a function that the print data analyzing unit 304 includes, there is a function in which the page is interpreted as a blank sheet if not even a single command that contributes directly to the rendering processing is included in a page. Also, there are those that include a function for economizing blank sheets that controls the output of pages determined to be blank sheets in accordance with a user setting via the operation panel.

In the third embodiment, by using the function for economizing blank sheets, rather than spooling resource control commands included in a page targeted for deletion, and also, rather than outputting a page start command as a dummy as in the second embodiment, processing for deletion of a particular page is realized.

Although the print data processing unit 309 according to the third embodiment outputs resource control commands and a page start command, and a page end command of a page targeted for deletion in the order that they are issued, commands that contribute directly to the rendering processing are not included in the page structure. For that reason, by the function for economizing blank sheets, a page targeted for deletion within processed PDL data is deleted without being printed. Note, if a setting for economizing blank sheets according to a user setting via the operation panel is invalid, it is necessary to insert a command for temporarily validating the setting for economizing blank sheets for a page targeted for deletion, and to insert a command that returns the blank sheet economization invalidation at the end of the page targeted for deletion. Herein, details of the third embodiment will be described with reference to the pattern diagram of FIG. 10 and the flowchart of FIG. 11. Note, because the configurations of the PC 101, the image processing apparatus 102, and the print system according to the third embodiment are the same as the previously described first embodiment, explanation thereof will be omitted.

Figure 10:
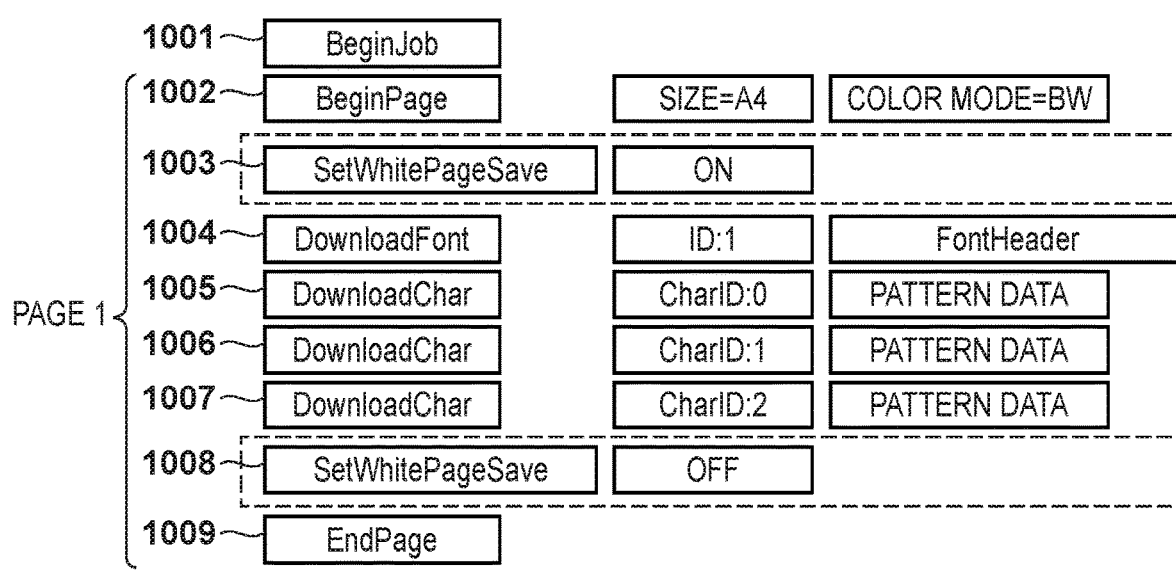
FIG. 10 is a view for illustrating a configuration of PDL data after page deletion processing in a third embodiment.

FIG. 10 is a view for illustrating a configuration of PDL data after page deletion processing in a third embodiment. Note that received PDL data 321 is the same as FIG. 6A of the first embodiment, and 1001 through 1002, 1004 through 1007, and 1009 correspond to 601 through 602 of FIG. 6A, 603 through 606 of FIG. 6A, and 608 of FIG. 6A, respectively.

In the third embodiment, because the function for economizing blank sheets that the print data analyzing unit 304 includes is made to be temporarily valid, first a SetWhitePageSave command 1003 of the page targeted for deletion is inserted with the parameter "ON". Then, at the end of the page structure of page 1, a SetWhitePageSave command 1008 with the parameter "OFF" is inserted. In this way, by the function for economizing blank sheets, a page targeted for deletion within processed PDL data can be deleted without being printed. Note, as explained later in the flowchart of FIG. 11, if the setting for economizing blank sheets is valid beforehand, it is not necessary to insert commands 1003 and 1008 because blank sheets are controlled to be economized.

Figure 11:
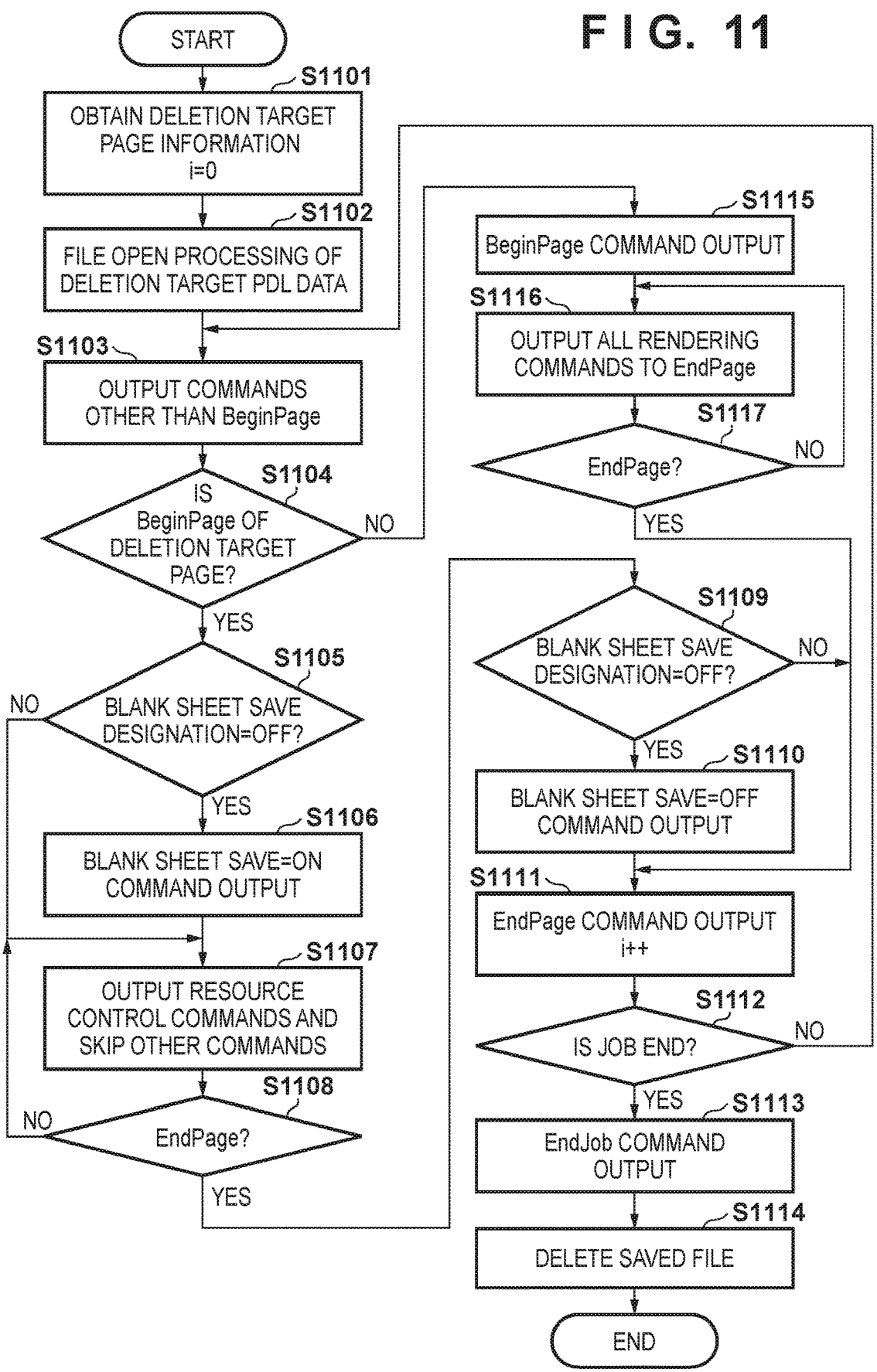
FIG. 11 is a view for illustrating a flowchart of page deletion processing in the third embodiment.

FIG. 11 is a view for illustrating a flowchart of page deletion processing in the third embodiment. Note, a program that executes this process is stored in the flash memory 203 or the HDD 211. Also, the processing illustrated by this flowchart is achieved by this program being loaded into the RAM 204 and executed under the control of the CPU 202. As described above, the CPU 202 functions as each functional unit as illustrated in FIG. 3 by execution of a program. The processing procedure according to this flowchart will be explained using each functional unit.

Because step S1101 through step S1104, step S1115, step S1116 through step S1117, step S1107 through step 1108, and step S1112 through step S1114 of FIG. 11 are the same as step S701 through step S704, step S711, step S713 through step S714, step S705 through step S706, and step S708 through step S710 of FIG. 7 of the first embodiment, respectively, explanation of these steps are omitted.

When the print data processing unit 309, according to the third embodiment, in step S1104, detects the BeginPage command 1002 of the page targeted for deletion, it advances the processing to step S1105. Then, the print data processing unit 309 determines whether or not the setting for economizing blank sheets is in an off state by a user setting. Then, if the setting is invalid (off), processing proceeds to step S1106, the print data processing unit 309 outputs the command 1003 that changes blank sheet economization to an ON state. After this, similar to the first embodiment previously described, the print data processing unit 309 outputs only resource control commands within the deletion target page in step S1107 and step S1108. Then, in step S1108, if the print data processing unit 309 detects an EndPage command 1009, processing proceeds to step S1109 and it is investigated whether or not the setting for economizing blank sheets is off. Here, if it is determined that is the setting for economizing blank sheets is invalid (off), the print data processing unit 309 advances the processing to step S1110, and a command is output for returning the blank sheet economization that was set to on in step S1106 to off. Also, unlike the first embodiment previously described, in the third embodiment, after an EndPage command is output in step S1111, the value of the variable i, which indicates the number of pages processed, is incremented leaving the page structure of the page targeted for deletion as is.

According to the third embodiment as described above, resource control commands and a BeginPage command included in the page targeted for deletion are not deleted, and it is possible to omit printing of this page only. By this, it is not necessary to cause a command included in a page targeted for deletion to be saved as in step S712 of FIG. 7 of the first embodiment, and it is also not necessary to overwrite by a command of a page not targeted for deletion as in step S914 of FIG. 9 of the second embodiment.

Fourth Embodiment

Although explanation is given in the above described first through third embodiments regarding a case of a language specification in which resource control commands are issued within a page structure surrounded by BeginPage and End-Page commands, the present invention is not limited to this, and a case in which they are issued outside of the page structure is applicable. Note, because the configurations of the PC 101, the image processing apparatus 102, and the print system according to the fourth embodiment are the same as the previously described first embodiment, explanation thereof will be omitted.

Figure 12:
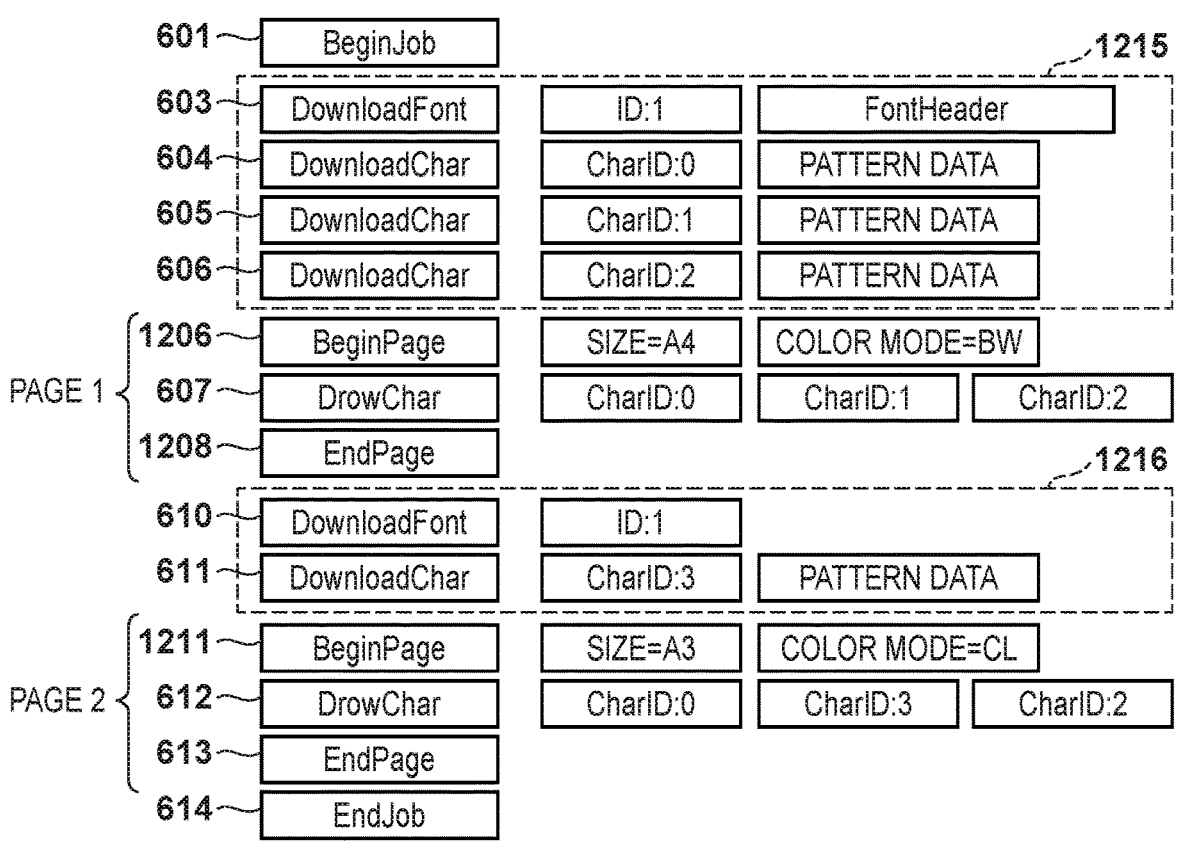
FIG. 12 is a view for illustrating a configuration of PDL data in a fourth embodiment.

FIG. 12 is a view for illustrating a configuration of PDL data in the fourth embodiment. Note, in FIG. 12, parts that are common to FIG. 6A of the previously described first embodiment are indicated with the same reference numerals, and explanation of these is omitted.

It is illustrated that resource control commands, such as resource registration or deletion, can be issued by commands 1215 preceding BeginPage 1206 of page 1 and commands 1216 between EndPage 1208 of page 1 and BeginPage 1211 of page 2.

If PDL of such a language specification is made to be the target of processing, the print data processing unit 309 may also output the resource control commands 1215 and 1216 that are issued outside of the page structure unchanged. Accordingly, the processing procedure may be the same process as in the flowchart illustrated in FIG. 7 of the first embodiment. This is because the group of commands issued outside of the page structure is output by the processing illustrated in step S703.

Fifth Embodiment

In the embodiments 1 through 4 previously described, the print job management unit 302, in accordance with a pressing of the print button 408 that is displayed on the preview screen of FIG. 4, calls the print data processing unit 309 to process the PDL data to exclude the page targeted for deletion in advance. By using such a configuration, it is possible to delete an unnecessary page structure from the PDL data prior to analysis processing by the print data analyzing unit 304.

Meanwhile, there are PDL of types for which a rendering status can be inherited across pages in addition to resources, such as font data and tile patterns, depending on the PDL language specification. As examples of rendering statuses, there are various items, such as a pen color or a pen thickness, which is used in rendering processing, an ROP (raster operation processing) calculation, a font selection parameter including a character size, and the like. Note, in the explanation hereinafter, in a case in which a rendering status spans pages, "rendering status inheritance level is job" is recited, and, in a case in which the rendering status is set to an initial value in accordance with switching of the page, "rendering status inheritance level is page" is recited.

Regarding the PDL of the language specification as described above, although deletion of a particular page can be realized by outputting commands that influence the rendering status included in the deletion target page, configuration can be taken to switch the processing method in accordance with PDL language specification. In the fifth embodiment, the following three types of processes are switched as page deletion methods in accordance with a resource and a rendering status inheritance level.

(A) Resource Inheritance Level and Rendering Status Inheritance Level are Both Page <Method A>

All commands from a page start command to a page end command of a page targeted for deletion are skipped by the print data processing unit 309. In such a case, resource control commands that are included in the page targeted for deletion can be skipped without considering a reference state across pages because resource inheritance level is page.

(B) Resource Inheritance Level is Job, and Rendering Status Inheritance Level is Page <Method B>

Commands of a page targeted for deletion are skipped by the print data processing unit 309 that applied one of the methods explained in the previously described embodiments 1 through 4.

(C) Resource Inheritance Level is Anything, and Rendering Status Inheritance Level is Job <Method C>

The print data processing unit 309 adds deletion target page information to a job control header portion and ends the processing. Then, at a time of a print process, the print data analyzing unit 304, having analyzed the job control header portion, conveys the deletion target page information to the engine control unit 306. When the engine control unit 306 receives a notification of the deletion target page information, it determines that the PDL data that corresponds to the page targeted for deletion is not be deleted. Then, image data of the page targeted for deletion specified from the deletion target page information is read and discarded rather than being output to the printer engine 215.

Note, a determination of the resource inheritance level and the rendering status inheritance level is performed by either a method in which a determination is made statically depending on the type of PDL language, or a method in which the determination is made dynamically by analyzing commands that designate the inheritance level. For example, a BeginJob command that defines a job start can be used as a command that designates the inheritance level, where the inheritance level is designated by the parameters of the command. Also, a configuration may be taken so as to determine the inheritance level by combining determination according to commands that designate the inheritance level and determination according to the type of the PDL language.

Figure 13:
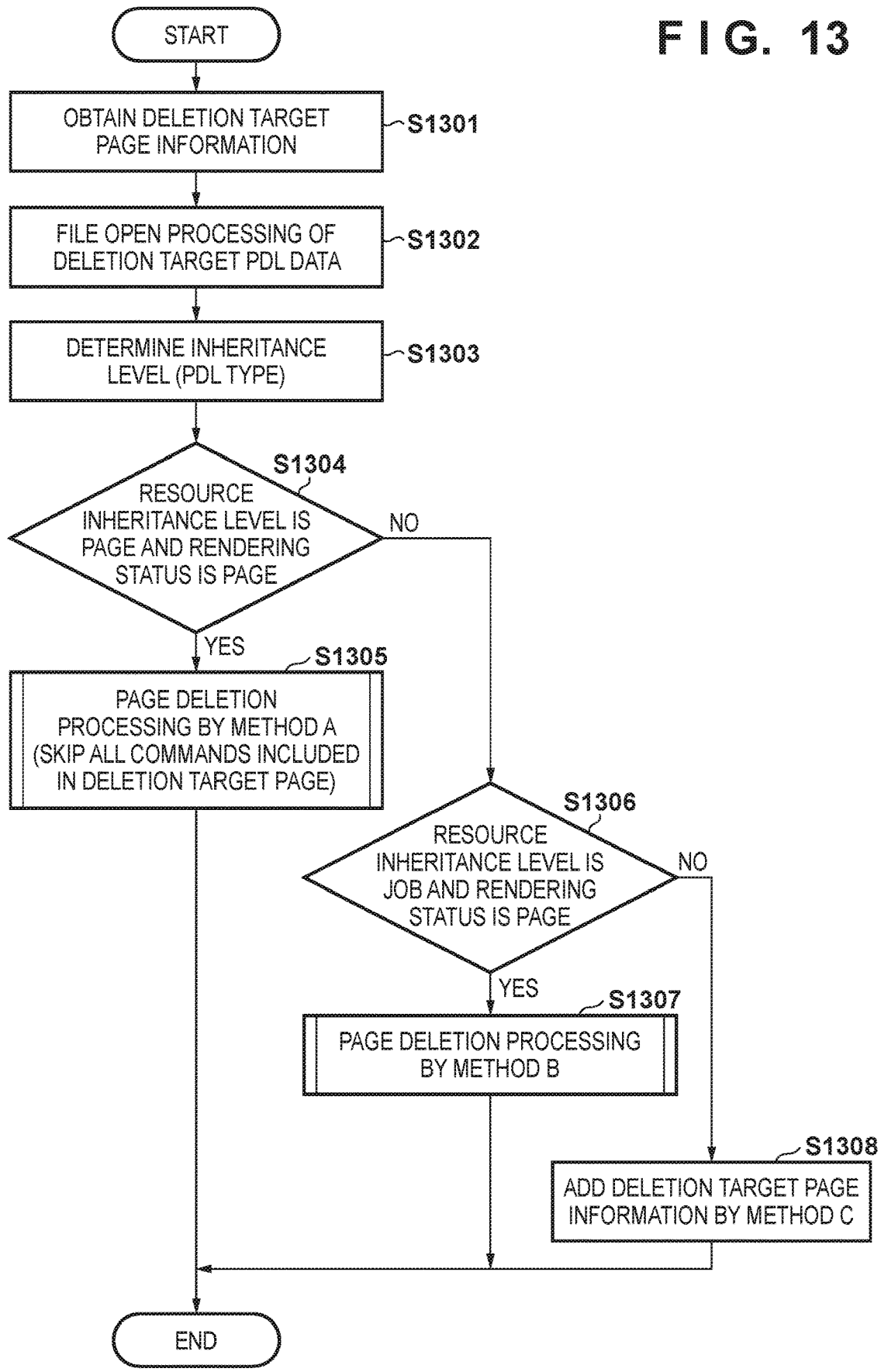
FIG. 13 is a view for illustrating a flowchart of page deletion processing in a fifth embodiment.

FIG. 13 is a view for illustrating a flowchart of page deletion processing in the fifth embodiment. Note, a program that executes this process is stored in the flash memory 203 or the HDD 211, and, at a time of execution, the process illustrated in this flowchart is achieved by loading the program into the RAM 204 and executing it under the control of the CPU 202. Here, the processing procedure according to this flowchart is explained as processing according to each functional unit explained in FIG. 3, whose function is achieved by the CPU 202 executing the program. Note, because the configurations of the PC 101, the image processing apparatus 102, and the print system according to the fifth embodiment are the same as the previously described first embodiment, explanation thereof will be omitted.

The content of each process of step S701 through step S702 of the first embodiment is the same as step S1301 through step S1302 in FIG. 13, so explanation is omitted.

In step S1303, the print data processing unit 309 reads out the job control header portion 501 illustrated in FIG. 5, or a parameter of a job start command, and determines the type of inheritance level. In the fifth embodiment, a PDL type "PDL1" is determined from a character sequence continuing from "@PJL ENTER LANGUAGE=" and the inheritance level that is determined in advance for each PDL type is determined. The print data processing unit 309, having advanced the processing to step S1304, determines whether the resource and rendering status inheritance levels based on the determination result of the PDL type corresponds to A, as described above. Here, in a case in which the inheritance level is A, the print data processing unit 309 advances the processing to step S1305, and all commands that are included in the page targeted for deletion are deleted according to method A, as described above. On the other hand, when the print data processing unit 309 determines that the inheritance level is not A in step S1304, it advances processing to step S1306, and determines whether or not the inheritance level is B, as described above. When it is determined that the inheritance level is B, the print data processing unit 309 advances processing to step S1307, and the page deletion process is performed according to method B. Also, when the print data processing unit 309 determines that the inheritance level is not B in step S1306, it determines that it is method C, as described above, and advances processing to step S1308, and performs the page deletion process according to method C, as described above. In other words, in step S1308, the print data processing unit 309 adds the deletion target page information to the PDL data, outputs the PDL data 322, and ends the processing.

Figure 14:
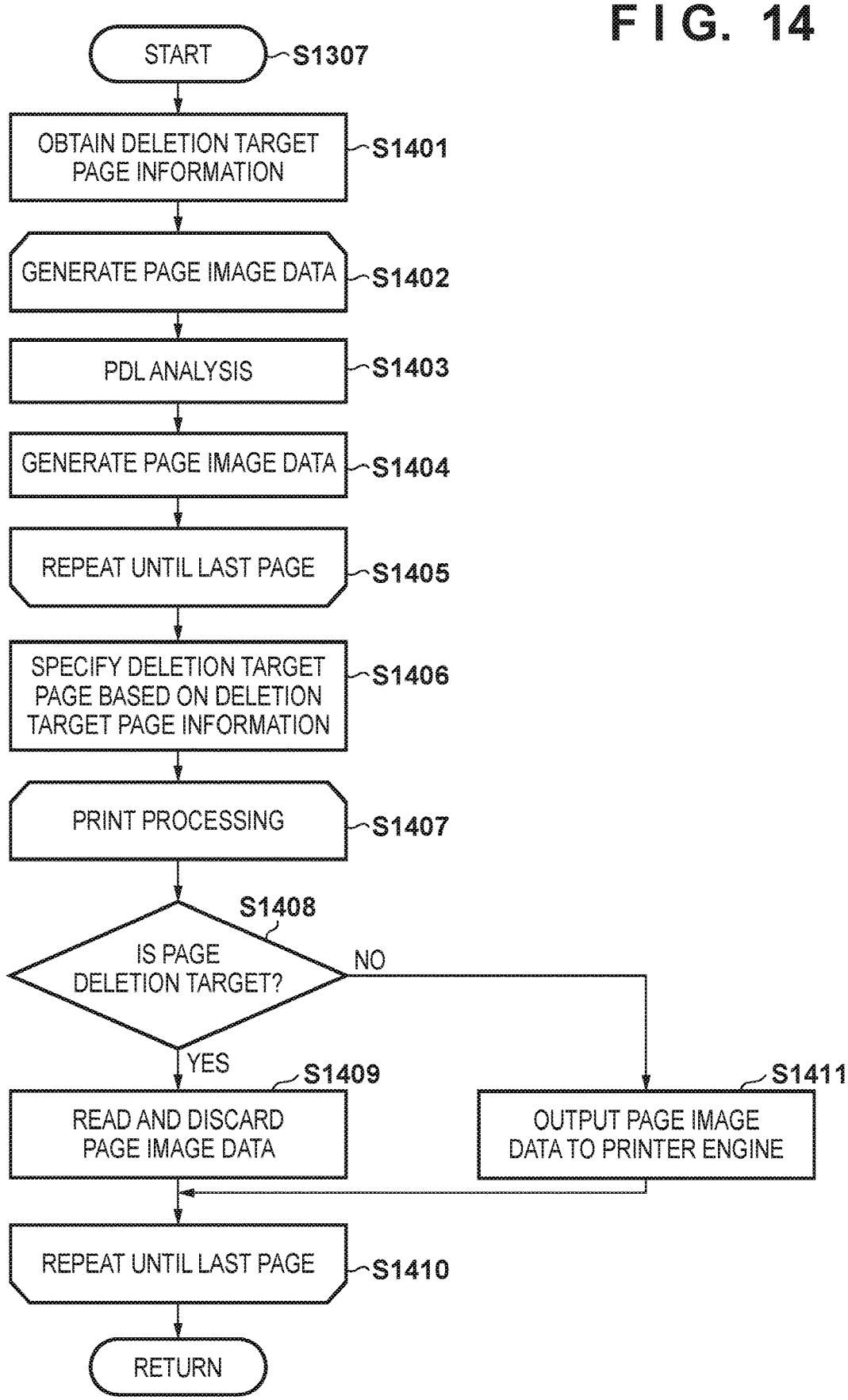
FIG. 14 is a view for illustrating a flowchart of page deletion processing in the fifth embodiment.

FIG. 14 is a view for illustrating a flowchart of page deletion processing in the fifth embodiment. Note, a program that executes this process is stored in the flash memory 203 or the HDD 211, and, at a time of execution, the process illustrated in this flowchart is achieved by loading the program into the RAM 204 and executing it under the control of the CPU 202. Here, each step of step S1401 through step S1405 is a step that the print data analyzing unit 304 and the page image generation unit 305 execute, and step S1406 through step S1410 are steps that the engine control unit 306 executes.

First, the print data analyzing unit 304 in step S1401 references the PDL data 322 that the print data processing unit 309 outputs to obtain the deletion target page information, and makes a notification of the information to the engine control unit 306 because the engine control unit 306 references the information from step S1406 onward. Next, each step in step S1402 through step S1405 may be similar to a normal print process for which page deletion is not performed. First, the print data analyzing unit 304 analyzes the PDL data in step S1403, and in step S1404, the page image generation unit 305 generates the page image data based on the analysis result and saves this to the HDD 211. Then, all page image data that is contained in the PDL data is generated by repeating the processing for generating the page image data until a job end command is detected in step S1405.

When the page image data is generated in this way, in the loop processing from step S1406, the engine control unit 306 reads out in sequence the page image data that is saved in the HDD 211, and outputs only the page image data that is not a page targeted for deletion to the printer engine 215 to be printed. As a consequence, in step S1406, the engine control unit 306 firstly references the deletion target page information that was received from the print data analyzing unit 304 to specify a page targeted for deletion. Then, in the loop processing from step S1407, the engine control unit 306 reads out in sequence the page image data that is already saved in the HDD 211 from the head page, and determines whether or not there is a page targeted for deletion in step S1408. Here, when it is determined that the read out page image data is a page targeted for deletion, the engine control unit 306 advances processing to step S1409, and reads and discards this image data rather than outputting it to the printer engine 215. On the other hand, in a case in which it is determined that it is not a page targeted for deletion, the engine control unit 306 advances processing to step S1411, and outputs the image data to the printer engine 215 to be printed as normal. Thus, by the reading and discarding the page image data or repeating the print processing until the final page within the print job, printing can be performed so as to only not print the page targeted for deletion.

Note that, in the fifth embodiment, in order to simplify the explanation, explanation has been given for sequentially executing up until the page image data is generated, and output processing of the page image data. Analysis of the PDL data, generation of the page image data, and printing of the generated the page image data may, however, also be executed in parallel.

According to the fifth embodiment, as explained above, print processing that corresponds to deletion of a particular page may be realized by an optimal method in accordance with the PDL resource and rendering status inheritance level.

Note, even by applying method C that skips the page image data for all PDL types, deletion of a particular page can be realized. In such a case, however, analysis of the PDL data and page image data generation processing is performed even for the page targeted for deletion, so processing efficiency is lower when compared to method A and method B, which are realized by processing the PDL data in advance.

As described above, by virtue of the present invention, it is possible to provide a more convenient image processing apparatus that can efficiently delete a particular page included in a print job described by PDL data even in a case in which a PDL data resource inheritance level spans pages.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
   (A) a printer that prints an image on a sheet;
   (B) an operation panel that receives an operation from a user;
   (C) a storage device that stores page description language (PDL) data, wherein the PDL data includes at least PDL commands for a plurality of pages received from an external apparatus, wherein the PDL commands include a register command and another command other than the register command, wherein the register command is a command for registering a resource which can be used across more than one page, wherein the register command and the resource are included in a page structure of a page among the plurality of pages, and wherein the register command is included in the page structure defined by a command indicating a start of page description and a command indicating an end of page description; and
   (D) at least one processor that executes a set of instructions:
   (a) to receive, via the operation panel, a delete instruction for deleting a selected page of the plurality of pages;
   (b) to edit the PDL data based on the delete instruction of the selected page, wherein the register command and the resource included in the page structure of the selected page are moved to a page structure of a page other than the selected page, wherein the register command and the resource remain in the edited PDL data, and wherein the another command among a group of PDL commands included in the page structure of the selected page is deleted;
   (c) to generate image data based on the edited PDL data; and
   (d) to cause the printer to execute printing based on the generated image data.

2. The printing apparatus according to claim 1, wherein the resource is at least one of rendering data of font and rendering data of character for printing the PDL data.

3. The printing apparatus according to claim 1, wherein the at least one processor further executes the instructions:
   (e) to output, as the edited PDL data, all of PDL commands included in page structures of pages other than the selected page to be deleted;
   (f) to discard the another command among the PDL commands included in the page structure of the selected page, without outputting the another command; and
   (g) to edit the PDL data so that the register command and the resource included in the page structure of the selected page remain in the edited PDL data, by retracting the register command and the resource included in the page structure of the selected page and outputting a group of PDL commands including the retracted register command when outputting a group of PDL commands included in page structures of subsequent pages, other than the selected page.

4. The printing apparatus according to claim 1, wherein the another command includes a drawing command for drawing using data related to font or glyph data corresponding to Character registered into the printing apparatus in accordance with the register command.

5. The printing apparatus according to claim 1, wherein the another command includes a start command indicating a start of a page, and an end command indicating an end of the page.

6. The printing apparatus according to claim 1, wherein the at least one processor further executes the instructions:
(e) to determine whether or not the resource registered in accordance with the register command is valid across a plurality of pages included in the PDL data; and
(f) to delete all of the PDL commands constituting the selected page in a case where it is determined that the resource registered in accordance with the register command is not valid across the plurality of pages included in the PDL data.

7. The printing apparatus according to claim 6, wherein the at least one processor further executes the instructions:
(g) to include the register command and the resource included in the page structure of the selected page in the PDL commands constituting subsequent pages other than the selected page in a case where it is determined that the resource registered in accordance with the register command is valid across the plurality of pages included in the PDL data.

8. The printing apparatus according to claim 6, wherein the another command includes a drawing command for drawing using data related to font or glyph data corresponding to Character registered in accordance with the register command.

9. The printing apparatus according to claim 6, wherein the another command includes a start command indicating a start of a page, and an end command indicating an end of the page.

10. The printing apparatus according to claim 1, wherein the at least one processor further executes the instructions:
(e) to generate a preview image of the plurality of pages;
(f) to display the generated preview image on the operation panel; and
(g) to receive the delete instruction for deleting the page selected from among the displayed preview image of the plurality of pages.

11. The printing apparatus according to claim 1, wherein the at least one processor further executes the instructions:
(e) to download the resource in accordance with the register command.

12. The printing apparatus according to claim 1, wherein the PDL data is edited based on the delete instruction of the selected page so that the register command and the resource included in the page structure of the selected page is included in at least one page other than the selected page.

13. The printing apparatus according to claim 1, wherein a page structure of a single page is defined with PDL commands which indicate a PDL job start and a PDL job end.

14. A control method of controlling an information processing apparatus, the control method comprising:
storing, in a storage device, page description language (PDL) data, wherein the PDL data includes at least PDL commands for a plurality of pages received from an external apparatus, wherein the PDL commands include a register command and another command other than the register command, wherein the register command is a command for registering a resource which can be used across more than one page, wherein the register command and the resource are included in a page structure of a page among the plurality of pages, and wherein the register command is included in the page structure defined by a command indicating a start of page description and a command indicating an end of page description;
receiving, via the operation panel, a delete instruction for deleting a selected page of the plurality of pages;
editing the PDL data based on the delete instruction of the selected page, wherein the register command and the resource included in the page structure of the selected page are moved to a page structure of a page other than the selected page, wherein the register command and the resource remain in a page structure of a page included in the edited PDL data, and wherein the another command among a group of PDL commands included in the page structure of the selected page is deleted; and
generating image data based on the edited PDL data.

15. A non-transitory computer-readable storage medium storing a computer program for causing a computer to execute processes of a control method of an information processing apparatus, the control method comprising:
storing, in a storage device, page description language (PDL) data, wherein the PDL data includes at least PDL commands for a plurality of pages received from an external apparatus, wherein the PDL commands include a register command and another command other than the register command, wherein the register command is a command for registering a resource which can be used across more than one page, wherein the register command and the resource are included in a page structure of a page among the plurality of pages, and wherein the register command is included in the page structure defined by a command indicating a start of page description and a command indicating an end of page description;
receiving, via the operation panel, a delete instruction for deleting a selected page of the plurality of pages;
editing the PDL data based on the delete instruction of the selected page, wherein the register command and the resource included in the page structure of the selected page are moved to a page structure of a page other than the selected page, wherein the register command and the resource remain in a page structure of a page included in the edited PDL data, and wherein the another command among a group of PDL commands included in the page structure of the selected page is deleted; and
generating image data, based on the edited PDL data.

16. An information processing apparatus comprising:
a storage device that stores page description language (PDL) data, wherein the PDL data includes at least PDL commands for a plurality of pages received from an external apparatus, wherein the PDL commands include a register command and another command other than the register command, wherein the register command is a command for registering a resource which can be used across more than one page, wherein the register command and the resource are included in a page structure of a page among the plurality of pages, and wherein the register command is included in the page structure defined by a command indicating a start of page description and a command indicating an end of page description; and
at least one processor that executes a set of instructions:
(a) to receive a delete instruction for deleting a selected page of the plurality of pages from a user;
(b) to edit the PDL data based on the delete instruction of the selected page, wherein the register command and the resource included in the page structure of the selected page are moved to a page structure of a page other than the selected page, wherein the register command and the resource remain in a page structure of a page included in the edited PDL data, and wherein the another command among a group of PDL commands included in the page structure of the selected page is deleted; and (c) to generate image data based on the edited PDL data.

17. The information processing apparatus according to claim 16, wherein the resource is at least one of rendering data of font and rendering data of character for printing the PDL data.

18. The information processing apparatus according to claim 16, wherein the register command and the resource included in the page structure of the selected page are moved to a page structure of a next page of the selected page.

* * * * *